United States Patent
Lee

(10) Patent No.: US 12,222,034 B1
(45) Date of Patent: Feb. 11, 2025

(54) SHIFT CONTROL METHOD FOR VEHICLE POWERTRAIN

(71) Applicants: HYUNDAI MOTOR COMPANY, Seoul (KR); KIA CORPORATION, Seoul (KR)

(72) Inventor: Sang Chul Lee, Seoul (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 0 days.

(21) Appl. No.: 18/417,308

(22) Filed: Jan. 19, 2024

(30) Foreign Application Priority Data

Sep. 4, 2023 (KR) .................... 10-2023-0117149

(51) Int. Cl.
  *F16H 61/28* (2006.01)
  *F16H 59/48* (2006.01)
  *F16H 61/04* (2006.01)
  *F16H 61/00* (2006.01)

(52) U.S. Cl.
  CPC ......... *F16H 61/2807* (2013.01); *F16H 59/48* (2013.01); *F16H 61/0437* (2013.01); *F16H 2061/0087* (2013.01); *F16H 2061/2823* (2013.01)

(58) Field of Classification Search
  CPC .. F16H 61/2807; F16H 61/0437; F16H 59/48; F16H 2061/0087; F16H 2061/2823
  See application file for complete search history.

(56) References Cited

U.S. PATENT DOCUMENTS

| | | | | |
|---|---|---|---|---|
| 6,594,573 | B1* | 7/2003 | Rossmann | G05B 13/04 701/67 |
| 2002/0116109 | A1* | 8/2002 | Takatori | F16H 61/08 701/55 |
| 2003/0027679 | A1* | 2/2003 | Sakamoto | F16H 61/061 475/120 |
| 2018/0202543 | A1* | 7/2018 | Srinivasan | B60W 10/115 |
| 2022/0402496 | A1* | 12/2022 | Kim | F16D 48/06 |

FOREIGN PATENT DOCUMENTS

KR    2023-0024493 A    2/2023

* cited by examiner

*Primary Examiner* — Lori Wu
(74) *Attorney, Agent, or Firm* — MCDONNELL BOEHNEN HULBERT & BERGHOFF LLP

(57) ABSTRACT

A shift control method for a vehicle powertrain includes determining, by a controller, whether a transmission is shifting and determining the type of shifting when the transmission is shifting, selecting a predetermined control matrix depending on whether the transmission is shifting and the type of shifting, calculating a necessary torque of a control target shift element on the basis of the selected control matrix, calculating a control hydraulic pressure for implementing the necessary torque of the control target shift element, and controlling the control target shift element by using the calculated control hydraulic pressure, and the control matrix is calculated by using relationship formulas of angular velocities, angular accelerations, moments of inertia, and torques of powertrain components and using a boundary condition according to a state of the transmission.

17 Claims, 18 Drawing Sheets

FIG. 2

| shift position | shift element | | | | | |
|---|---|---|---|---|---|---|
| | UDC | ODC | 37RC | 46C | 28B | LRB |
| P |  |  |  |  |  | ○ |
| R |  |  | ○ |  |  | ○ |
| N |  |  |  |  |  | ○ |
| 1 | ○ |  |  |  |  | ○ |
| 2 | ○ |  |  |  | ○ |  |
| 3 | ○ |  | ○ |  |  |  |
| 4 | ○ |  |  | ○ |  |  |
| 5 | ○ | ○ |  |  |  |  |
| 6 |  | ○ |  | ○ |  |  |
| 7 |  | ○ | ○ |  |  |  |
| 8 |  | ○ |  |  | ○ |  |

| | (T_T) | (T_RD) | (T_DC) | (T_OD) | (T_UD) | (T_46) | (T_28) | (T_87) | (T_LRB) | (T_C) | (T_IS) | (T_MT) | (T_Imc) |
|---|---|---|---|---|---|---|---|---|---|---|---|---|---|
| $\dot{\omega}_T$ | 0.304 | -0.034 | 0.304 | -0.236 | 0.000 | -0.304 | 0.000 | -0.163 | -0.068 | 0.000 | 0.000 | 0.000 | 0.000 |
| $\dot{\omega}_{IS}$ | 0.304 | -0.034 | 0.304 | -0.236 | 0.000 | -0.304 | 0.000 | -0.163 | -0.068 | 0.000 | 0.000 | 0.000 | 0.000 |
| $\dot{\omega}_{S1}$ | 0.000 | 0.000 | 0.000 | 0.000 | 0.000 | 0.000 | 0.000 | 0.000 | 0.000 | 0.000 | 0.000 | 0.000 | 0.000 |
| $\dot{\omega}_{S2}$ | 0.163 | -0.018 | 0.163 | -0.127 | 0.000 | -0.163 | 0.000 | -0.087 | -0.036 | 0.000 | 0.000 | 0.000 | 0.000 |
| $\dot{\omega}_{R1}$ | 0.105 | -0.012 | 0.105 | -0.081 | 0.000 | -0.105 | 0.000 | -0.056 | -0.023 | 0.000 | 0.000 | 0.000 | 0.000 |
| $\dot{\omega}_{R2}$ | 0.000 | 0.000 | 0.000 | 0.000 | 0.000 | 0.000 | 0.000 | 0.000 | 0.000 | 0.000 | 0.000 | 0.000 | 0.000 |
| $\dot{\omega}_{C2}$ | 0.068 | -0.008 | 0.068 | -0.053 | 0.000 | -0.068 | 0.000 | -0.036 | -0.015 | 0.000 | 0.000 | 0.000 | 0.000 |
| $\dot{\omega}_C$ | 0.000 | 0.000 | 0.000 | 0.000 | 0.000 | 0.000 | 0.000 | 0.000 | 0.000 | 0.000 | 0.000 | 0.000 | 0.000 |
| $\dot{\omega}_{TF}$ | -0.101 | 0.011 | -0.101 | 0.078 | 0.000 | 0.101 | 0.000 | 0.054 | 0.022 | 0.000 | 0.000 | 0.000 | 0.000 |
| $\dot{\omega}_{OUT}$ | 0.034 | -0.004 | 0.034 | -0.027 | 0.000 | -0.034 | 0.000 | -0.018 | -0.008 | 0.000 | 0.000 | 0.000 | 0.000 |
| $\dot{\omega}_E$ | 0.000 | 0.000 | -4.931 | 0.000 | 0.000 | 0.000 | 0.000 | 0.000 | 0.000 | 4.931 | 0.000 | 0.000 | -4.931 |
| $T_{UD}$ | 2.563 | 0.006 | 2.563 | -2.575 | 0.000 | -2.563 | 0.000 | -1.375 | 0.012 | 0.000 | 0.000 | 0.000 | 0.000 |
| $T_{28}$ | -1.017 | -0.002 | -1.017 | 1.374 | 0.000 | 2.017 | 0.000 | 1.546 | -0.357 | 0.000 | 0.000 | 0.000 | 0.000 |
| $T_{IS}$ | 0.985 | 0.002 | 0.985 | 0.012 | 0.000 | 0.015 | 0.000 | 0.008 | 0.003 | 0.000 | 0.000 | 0.000 | 0.000 |
| $T_{MT}$ | -1.863 | -0.004 | -1.863 | 2.224 | 0.000 | 2.863 | 0.000 | 1.536 | 0.639 | -1.000 | 0.000 | 0.000 | 0.000 |

D = { $T_T$, $T_{RD}$, $T_{DC}$, $T_{OD}$, $T_{UD}$, $T_{46}$, $T_{28}$, $T_{87}$, $T_{LRB}$, $T_C$, $T_{IS}$, $T_{MT}$, $T_{Imc}$ }

| | $(T_T)$ | $(T_{RD})$ | $(T_{DC})$ | $(T_{OD})$ | $(T_{UD})$ | $(T_{46})$ | $(T_{28})$ | $(T_{37})$ | $(T_{LR8})$ | $(T_E)$ | $(T_{IS})$ | $(T_{MT})$ | $(T_{Imp})$ |
|---|---|---|---|---|---|---|---|---|---|---|---|---|---|
| $\dot\omega_T$ | 8.901 | -0.014 | 8.901 | -11.853 | 0.000 | -17.357 | 8.456 | -13.232 | 2.951 | 0.000 | 0.000 | 0.000 | 0.000 |
| $\dot\omega_{IS}$ | 8.901 | -0.014 | 8.901 | -11.853 | 0.000 | -17.357 | 8.456 | -13.232 | 2.951 | 0.000 | 0.000 | 0.000 | 0.000 |
| $\dot\omega_{S1}$ | -8.456 | -0.020 | -8.456 | 11.425 | 0.000 | 16.773 | -8.317 | 12.854 | -2.969 | 0.000 | 0.000 | 0.000 | 0.000 |
| $\dot\omega_{S2}$ | 4.776 | -0.008 | 4.776 | -6.360 | 0.000 | -9.314 | 4.537 | -7.100 | 1.584 | 0.000 | 0.000 | 0.000 | 0.000 |
| $\dot\omega_{R1}$ | 0.044 | -0.012 | 0.044 | 0.001 | 0.000 | 0.016 | -0.060 | 0.036 | -0.045 | 0.000 | 0.000 | 0.000 | 0.000 |
| $\dot\omega_{R2}$ | -8.456 | -0.020 | -8.456 | 11.425 | 0.000 | 16.773 | -8.317 | 12.854 | -2.969 | 0.000 | 0.000 | 0.000 | 0.000 |
| $\dot\omega_{C2}$ | -2.951 | -0.015 | -2.951 | 4.027 | 0.000 | 5.921 | -2.969 | 4.553 | -1.075 | 0.000 | 0.000 | 0.000 | 0.000 |
| $\dot\omega_C$ | 0.000 | 0.000 | 0.000 | 0.000 | 0.000 | 0.000 | 0.000 | 0.000 | 0.000 | 0.000 | 0.000 | 0.000 | 0.000 |
| $\dot\omega_{TF}$ | -0.042 | 0.011 | -0.042 | -0.001 | 0.000 | -0.015 | 0.058 | -0.035 | 0.043 | 0.000 | 0.000 | 0.000 | 0.000 |
| $\dot\omega_{OUT}$ | 0.014 | -0.004 | 0.014 | 0.000 | 0.000 | 0.005 | -0.020 | 0.012 | -0.015 | 0.000 | 0.000 | 0.000 | 0.000 |
| $\dot\omega_E$ | 0.000 | 0.000 | -4.931 | 0.000 | 0.000 | 0.000 | 0.000 | 1.004 | 0.000 | 4.931 | 0.000 | 0.000 | -4.931 |
| $T_{UD}$ | 0.998 | 0.002 | 0.998 | -0.460 | 0.000 | 0.542 | -1.539 | 1.004 | -0.538 | 0.000 | 0.000 | 0.000 | 0.000 |
| $T_{IS}$ | 0.550 | 0.001 | 0.550 | 0.600 | 0.000 | 0.878 | -0.428 | 0.670 | -0.149 | 0.000 | 0.000 | 0.000 | 0.000 |
| $T_{MT}$ | -0.359 | -0.001 | -0.359 | 0.192 | 0.000 | -0.120 | 1.479 | -0.750 | -1.167 | 0.000 | 0.000 | 0.000 | 0.000 |

$H$ (above) × $D$ $D$ = $\{T_T, T_{RD}, T_{DC}, T_{OD}, T_{UD}, T_{46}, T_{28}, T_{37}, T_{LR8}, T_E, T_{IS}, T_{MT}, T_{Imp}\}$

SHIFT CONTROL METHOD FOR VEHICLE POWERTRAIN

CROSS REFERENCE TO RELATED APPLICATIONS

The present application claims priority to Korean Patent Application No. 10-2023-0117149, filed on Sep. 4, 2023, the entire contents of which are incorporated herein for all purposes by this reference.

BACKGROUND

Field

The present disclosure relates to a technology for controlling a powertrain configured to transmit power, which is generated from an engine mounted in a vehicle, to a driving wheel.

Description of the Related Art

A vehicle powertrain includes a plurality of components, such as a transmission, in order to transmit power, which is generated from an engine, to a driving wheel at an appropriate rotational speed and torque.

A transmission control unit (TCU) configured to control the transmission is configured to control the transmission on the basis of various types of preset control data related to the transmission in order to perform control suitable for various traveling situations of a vehicle.

The control data in the related art are manually mapped by an operator while the operator repeatedly operates the corresponding transmission.

The control data, which are manually mapped as described above, are highly dependent on the experience and skill of the operator who maps the control data. For this reason, the data are unreliable, and a large amount of time is required to establish the control data.

Therefore, a vehicle powertrain model may be created, and the TCU may control the transmission on the basis of the powertrain model, such that the control data may be quickly mapped, the reliability of the control data may be ensured, and the shift quality of the vehicle may be improved.

The foregoing explained as the background of the disclosure is intended merely to aid in the understanding of the background of the present disclosure, and is not intended to mean that the present disclosure falls within the purview of the related art that is already known to those skilled in the art.

SUMMARY

The present disclosure is proposed to solve these problems and aims to provide a shift control method for a vehicle powertrain, which provides an appropriate solution in the event of a situation in which data required for shift control are difficult to ensure when a controller controls a transmission on the basis of a vehicle powertrain model, such that smooth and stable shift control may be achieved, thereby ensuring reliability of the shift control.

In order to achieve the above-mentioned object, the present disclosure provides a shift control method for a vehicle powertrain, the shift control method including calculating, by a controller configured to divide a shift process into a series of shift phases and perform shift control on the basis of the shift phase, a control hydraulic pressure basic calculation value for implementing a necessary torque of a control target shift element on the basis of the shift phase by using a control matrix created from a vehicle powertrain model, calculating a control hydraulic pressure correction calculation value by correcting the control hydraulic pressure basic calculation value with a correction value including a learning value for the shift element, and controlling the control target shift element based on the control hydraulic pressure correction calculation value, in which in the calculating of the control hydraulic pressure basic calculation value, the controller calculates the control hydraulic pressure basic calculation value by using predetermined back-up data when a predetermined reference shift phase for specifying data required to calculate the control hydraulic pressure basic calculation value does not exist.

When the reference shift phase exists, the controller may calculate the control hydraulic pressure basic calculation value by using the control hydraulic pressure correction calculation value in the reference shift phase.

When a hydraulic-pressure-preparation phase of an engagement-side shift element, which is the reference shift phase, exists when the controller calculates the control hydraulic pressure basic calculation value in an engagement preparation state of the engagement-side shift element, the controller may calculate the control hydraulic pressure basic calculation value by using the control hydraulic pressure correction calculation value at the end of the hydraulic-pressure-preparation phase.

When the hydraulic-pressure-preparation phase of the engagement-side shift element, which is the reference shift phase, does not exist when the controller calculates the control hydraulic pressure basic calculation value in the engagement preparation state of the engagement-side shift element, the controller may use, as the back-up data, an engagement-side basic preparation hydraulic pressure, which is calculated as a hydraulic pressure of the engagement-side shift element required to prevent a shifting sag phenomenon by using the control matrix.

When a first shift-initiation phase of an engagement-side shift element, which is the reference shift phase, exists when the controller calculates the control hydraulic pressure basic calculation value in a preliminary target state of the engagement-side shift element, the controller may calculate the control hydraulic pressure basic calculation value by using the control hydraulic pressure correction calculation value at the end of the first shift-initiation phase.

When the first shift-initiation phase of the engagement-side shift element, which is the reference shift phase, does not exist when the controller calculates the control hydraulic pressure basic calculation value in the preliminary target state of the engagement-side shift element, the controller may use, as the back-up data, a engagement-side preliminary target pressure reduced by multiplying an engagement-side basic target pressure, which is calculated as an engagement-side shift element hydraulic pressure when a turbine angular acceleration becomes zero by using the control matrix, by a predetermined buffer coefficient.

When the reference shift phase does not exist, the controller calculates an engagement-side basic target pressure that is an engagement-side shift element hydraulic pressure when a turbine angular acceleration becomes zero by using the control matrix, and the controller may use, as the back-up data, an engagement-side preliminary target pressure reduced by multiplying the engagement-side basic target pressure by a predetermined buffer coefficient.

When a first shift-initiation phase, which is the reference shift phase, exists when the controller calculates a gradient of the control hydraulic pressure correction calculation value of the engagement-side shift element in the first shift-initiation phase, the controller may calculate the gradient by subtracting the control hydraulic pressure correction calculation value at the end of the hydraulic-pressure-preparation phase from the control hydraulic pressure correction calculation value in the first shift-initiation phase and then dividing the resultant value by an elapsed time of the first shift-initiation phase.

When the first shift-initiation phase, which is the reference shift phase, does not exist when the controller calculates the gradient of the control hydraulic pressure correction calculation value of the engagement-side shift element in the first shift-initiation phase, the controller may calculate the gradient by subtracting the control hydraulic pressure correction calculation value at the end of the hydraulic-pressure-preparation phase from an engagement-side preliminary target pressure reduced by multiplying an engagement-side basic target pressure, which is calculated as an engagement-side shift element hydraulic pressure when a turbine angular acceleration becomes zero by using the control matrix, by a predetermined buffer coefficient and then dividing the resultant value by an elapsed time after the hydraulic-pressure-preparation phase.

When the controller calculates a gradient of the control hydraulic pressure correction calculation value of the engagement-side shift element in a second shift-initiation phase, the controller may calculate the gradient by dividing, by an elapsed time of the second shift-initiation phase, a difference between an engagement-side basic target pressure, which is calculated as an engagement-side shift element hydraulic pressure when a turbine angular acceleration becomes zero by using the control matrix, and an engagement-side preliminary target pressure reduced by multiplying the engagement-side basic target pressure by a predetermined buffer coefficient.

The control matrix may be calculated by using relationship formulas of angular velocities, angular accelerations, moments of inertia, and torques of powertrain components and using a boundary condition according to a state of a transmission, and the controller may perform the calculating of the control hydraulic pressure basic calculation value by selecting a predetermined control matrix on the basis of whether the transmission is shifting and the type of shifting.

The control matrix may be calculated by multiplying a reverse matrix of an angular acceleration dominant matrix, which includes coefficients of angular acceleration terms of the relationship formulas, by an external torque dominant matrix including coefficients of external torque terms of the relationship formulas, and the external torque may be torques that are controlled by the controller or inputted to the powertrain from the outside.

The control matrices may include: in-gear state control matrices related to an in-gear state in which the transmission is not shifting; and dynamic state control matrices related to a state in which the transmission is shifting.

The in-gear state control matrices may be provided one by one for each shift position implemented by the transmission, and the dynamic state control matrices may be provided one by one for each shift element continuously kept in an engaged state during a shift process.

When the transmission is shifting, the controller may select the control matrix for the shift element continuously kept in the engaged state before and after the shift process among the dynamic state control matrices.

In a state in which the angular acceleration terms of the relationship formulas are separated in the form of the product of an angular acceleration coefficient matrix and an angular acceleration column vector and placed on one side of an equal sign, and the external torque terms of the relationship formulas are separated in the form of the product of an external torque coefficient matrix and an external torque column vector and placed on the other side, the angular acceleration dominant matrix, among the external torque coefficient matrices, may be configured as a square matrix created by connecting and placing, to a right side of the angular acceleration coefficient matrix, a stiffness connection matrix created by multiplying, by −1, columns of the coefficients for the external torque terms considered as linear variables that vary depending on torque inputted to the powertrain by treating the powertrain components as completely connected, connecting and placing, at a bottom side of the angular acceleration coefficient matrix, a boundary condition matrix including rows representing boundary conditions according to the state of the transmission, and disposing a dummy matrix, which is filled with zero, at a position at which the boundary condition matrix and the stiffness connection matrix of the angular acceleration coefficient matrix intersect.

The external torque dominant matrix may include the dummy matrix in which columns used for the stiffness connection matrix are filled with zero, and rows corresponding to the boundary condition matrix of the angular acceleration dominant matrix are filled with zero among the external torque coefficient matrices.

The shift control method for a vehicle powertrain according to the present disclosure provides the appropriate solution in the event of a situation in which data required for the shift control are difficult to ensure when the controller controls the transmission on the basis of the vehicle powertrain model, such that the smooth and stable shift control may be achieved, thereby ensuring the reliability of the shift control.

BRIEF DESCRIPTION OF THE FIGURES

FIG. 2 is a table showing operating modes of a transmission in FIG. 1.

FIG. 4 is a matrix formula for expressing relationship formulas between angular velocities, angular accelerations, moment of inertia, and torques of powertrain components in FIG. 1 in the form of the product of an angular acceleration coefficient matrix and an angular acceleration column vector and the product of an external torque coefficient matrix and an external torque column vector.

FIG. 5 is a view illustrating an angular acceleration dominant matrix and an external torque dominant matrix related to a second shift position in-gear state of the transmission in a state in which a state column vector and an external torque column vector are omitted.

FIG. 6 is a view illustrating a relationship between the angular acceleration dominant matrix and the external torque dominant matrix for obtaining a dynamic state control matrix, which is an engaged state of an under-drive clutch, in a state in which the state column vector and the external torque column vector are omitted, as in FIG. 5.

FIG. 9 is a view illustrating a control matrix relationship formula in which the second shift position in-gear state control matrix is used.

FIG. 10 is a view illustrating a control matrix relationship formula that uses a dynamic state control matrix related to the under-drive clutch as a control matrix.

DETAILED DESCRIPTION

Figure 1:
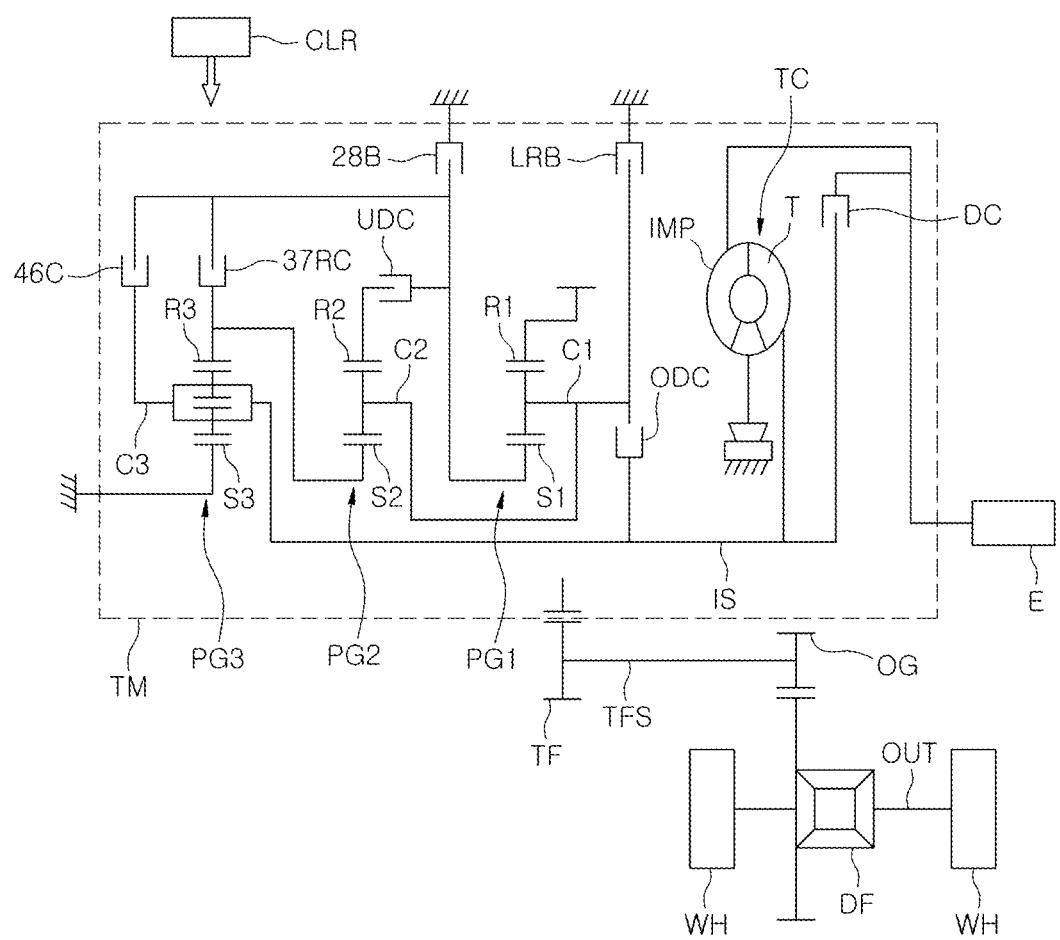
FIG. 1 is a view illustrating a vehicle powertrain to which the present disclosure may be applied.

Hereinafter, embodiments disclosed in the present specification will be described in detail with reference to the accompanying drawings. The same or similar constituent elements are assigned with the same reference numerals regardless of reference numerals, and the repetitive description thereof will be omitted.

The suffixes "module", "unit", "part", and "portion" used to describe constituent elements in the following description are used together or interchangeably in order to facilitate the description, but the suffixes themselves do not have distinguishable meanings or functions.

In the description of the embodiments disclosed in the present specification, the specific descriptions of publicly known related technologies will be omitted when it is determined that the specific descriptions may obscure the subject matter of the embodiments disclosed in the present specification. In addition, it should be interpreted that the accompanying drawings are provided only to allow those skilled in the art to easily understand the embodiments disclosed in the present specification, and the technical spirit disclosed in the present specification is not limited by the accompanying drawings, and includes all alterations, equivalents, and alternatives that are included in the spirit and the technical scope of the present disclosure.

The terms including ordinal numbers such as "first," "second," and the like may be used to describe various constituent elements, but the constituent elements are not limited by the terms. These terms are used only to distinguish one constituent element from another constituent element.

When one constituent element is described as being "coupled" or "connected" to another constituent element, it should be understood that one constituent element can be coupled or connected directly to another constituent element, and an intervening constituent element can also be present between the constituent elements. When one constituent element is described as being "coupled directly to" or "connected directly to" another constituent element, it should be understood that no intervening constituent element is present between the constituent elements.

Singular expressions include plural expressions unless clearly described as different meanings in the context.

In the present specification, it should be understood the terms "comprises," "comprising," "includes," "including," "containing," "has," "having" or other variations thereof are inclusive and therefore specify the presence of stated features, integers, steps, operations, elements, components, or combinations thereof, but do not preclude the presence or addition of one or more other features, integers, steps, operations, elements, components, or combinations thereof.

With reference to FIGS. 1 and 2, a vehicle powertrain, to which the present disclosure may be applied, has a transmission TM capable of implementing eight forward speeds and a rearward speed. When power of an engine E is transmitted to a torque converter TC having a damper clutch DC through an input shaft IS, the power is transmitted to the transmission TM through a turbine T and an impeller IMP of the torque converter TC. The transmission TM implements shift positions by means of three planetary gear trains and six shift elements (clutches or brakes) by using the received power, and the power is transmitted from an output element of the transmission TM to an output shaft OUT, to which a differential DF and a wheel WH are connected, through an out-gear OG and a transfer gear TF of a transfer shaft TFS.

The three planetary gear trains includes a first planetary gear train PG1, a second planetary gear train PG2, and a third planetary gear train PG3 that are sequentially disposed from the engine E. The first planetary gear train PG1 includes a first sun gear S1, a first carrier C1, and a first ring gear R1. The second planetary gear train PG2 includes a second sun gear S2, a second carrier C2, and a second ring gear R2. The third planetary gear train PG3 includes a third sun gear S3, a third carrier C3, and a third ring gear R3.

The six shift elements may include a low-reverse brake LRB, a 28-brake 28B, an over-drive clutch ODC, an under-drive clutch UDC, a 37R-clutch 37RC, and a 46-clutch 46C. A controller CLR, which communicates with various types of sensors of the vehicle or another controller such as an engine controller, may control the shift elements by generating an appropriate control hydraulic pressure.

Substantially, the controller CLR, which controls the transmission TM included in the powertrain, may be a transmission control unit (TCU) or the like.

The above-mentioned powertrain may be modeled on the basis of the following equations.

$$(1+\gamma_1)\omega_{C2} = \gamma_1\omega_{R1} + \omega_{S1} \quad \text{Equation 1}$$

$$(1+\gamma_2)\omega_{C2} = \gamma_2\omega_{R2} + \omega_{S2} \quad \text{Equation 2}$$

$$(-1+\gamma_3)\omega_T = \gamma_3\omega_{S2} \quad \text{Equation 3}$$

$$\omega_{R1} = -\gamma_{TF}\omega_{TF} \quad \text{Equation 4}$$

$$\omega_{TF} = -\gamma_{OG}\omega_{OUT} \quad \text{Equation 5}$$

$$T_{R1} = \gamma_1 T_{S1} \quad \text{Equation 6}$$

$$T_{R2} = \gamma_2 T_{S2} \quad \text{Equation 7}$$

$$T_{R3} = -\gamma_3 T_{S3} \quad \text{Equation 8}$$

-continued $$T_{Imp} = \gamma_4 T_T \quad \text{Equation 9}$$

$$I_T \dot{\omega}_T = T_T + T_{DC} - T_{IS} \quad \text{Equation 10}$$

$$I_{IS} \dot{\omega}_{IS} = T_{IS} - T_{OD} - T_{46} + T_{S3} + T_{R3} \quad \text{Equation 11}$$

$$I_{S1} \dot{\omega}_{S1} = -T_{UD} + T_{37R} + T_{46} - T_{28} - T_{S1} \quad \text{Equation 12}$$

$$I_{R2} \dot{\omega}_{R2} = T_{OD} - T_{LR} + T_{S1} + T_{R1} - T_{R2} \quad \text{Equation 13}$$

$$I_{R1} \dot{\omega}_{R1} = -T_{R1} - T_{TF} \quad \text{Equation 14}$$

$$I_{S2} \dot{\omega}_{S2} = -T_{37R} - T_{S2} - T_{R3} \quad \text{Equation 15}$$

$$I_{C2} \dot{\omega}_{S2} = T_{UD} + T_{S2} + T_{R2} \quad \text{Equation 16}$$

$$0 = -T_{S3} - T_{S3W} \quad \text{Equation 17}$$

$$I_{TF} \dot{\omega}_{TF} = \gamma_{TF} T_{TF} - T_{OG} = \gamma_{TF} T_{TF} - \frac{T_{OUT}}{\gamma_{OG}} \quad \text{Equation 18}$$

$$I_{DF} \dot{\omega}_{OUT} = \gamma_{OG} T_{OG} - T_{RD} = T_{OUT} - T_{RD} \quad \text{Equation 19}$$

$$I_C \dot{\omega}_C = -T_E - T_{MT} + T_{28} + T_{LR} + T_{S3} \quad \text{Equation 20}$$

$$I_E \dot{\omega}_E = T_E - T_{DC} - T_{Imp} \quad \text{Equation 21}$$

Here, $\gamma_1$: Gear ratio (number of teeth of ring gear/number of teeth of sun gear) of first planetary gear train PG1

$\gamma_2$: Gear ratio of second planetary gear train PG2

$\gamma_3$: Gear ratio of third planetary gear train PG3

$\gamma_{TF}$: Gear ratio between transmission output element and transfer gear TF For reference, the transmission output elements is the first ring gear R1 of the first planetary gear train PG1 in this case.

$\gamma_{OG}$: Gear ratio between out-gear OG and output shaft OUT

For reference, the output shaft OUT may be a concept including the differential DF engaging with the out-gear OG, the output shaft OUT coupled to the differential DF, and the wheel WH. More accurately, the output shaft OUT may be understood as being a gear ratio between the out-gear OG and a ring gear of the differential DF.

$\gamma_4$: Torque ratio of torque converter TC $\omega_{S1}$: Angular velocity of first sun gear S1 of first planetary gear train PG1

$\omega_{R1}$: Angular velocity of first ring gear R1 of first planetary gear train PG1

$\omega_{S2}$: Angular velocity of second sun gear S2 of second planetary gear train PG2

$\omega_{C2}$: Angular velocity of second carrier C2 of second planetary gear train PG2

$\omega_{R2}$: Angular velocity of second ring gear R2 of second planetary gear train PG2

$\omega_T$: Angular velocity of turbine T $\omega_{TF}$: Angular velocity of transfer gear TF $\omega_{OUT}$: Angular velocity of output shaft OUT $\dot{\omega}_T$: Angular acceleration of turbine T $\dot{\omega}_{IS}$: Angular acceleration of input shaft IS $\dot{\omega}_{S1}$: Angular acceleration of first sun gear S1 of first planetary gear train PG1

$\dot{\omega}_{R1}$: Angular acceleration of first ring gear R1 of first planetary gear train PG1

$\dot{\omega}_{S2}$: Angular acceleration of second sun gear S2 of second planetary gear train PG2

$\dot{\omega}_{C2}$: Angular acceleration of second carrier C2 of second planetary gear train PG2

$\dot{\omega}_{R2}$: Angular acceleration of second ring gear R2 of second planetary gear train PG2

$\dot{\omega}_{TF}$: Angular acceleration of transfer gear TF $\dot{\omega}_{OUT}$: Angular acceleration of output shaft OUT $\dot{\omega}_C$: Angular acceleration of transmission case TMC $\dot{\omega}_E$: Angular acceleration of engine E $T_S1$: Torque of first sun gear S1 of first planetary gear train PG1

$T_{R1}$: Torque of first ring gear R1 of first planetary gear train PG1

$T_{S2}$: Torque of second sun gear S2 of second planetary gear train PG2

$T_{R2}$: Torque of second ring gear R2 of second planetary gear train PG2

$T_{S3}$: Torque of third sun gear S3 of third planetary gear train PG3

$T_{R3}$: Torque of third ring gear R3 of third planetary gear train PG3

$T_{S3}w$: Reaction force torque of transmission case TMC with respect to third ring gear R3 of third planetary gear train PG3

$T_{Imp}$: Torque of impeller IMP $T_T$: Torque of turbine T $T_{DC}$: Torque of damper clutch DC $T_{IS}$: Torque of input shaft IS $T_{OD}$: Torque of over-drive clutch ODC $T_{46}$: Torque of 46-clutch 46C $T_{UD}$: Torque of under-drive clutch UDC $T_{37R}$: Torque of 37R-clutch 37RC $T_{28}$: Torque of 28-brake 28B $T_{LR}$: Torque of low-reverse brake LRB $T_{TF}$: Torque of transfer gear TF $T_{OG}$: Torque of out-gear OG $T_{OUT}$: Torque of output shaft OUT $T_{RD}$: Traveling resistance torque $T_E$: Engine torque $T_{MT}$: Mounting torque of transmission TM $I_T$: Moment of inertia of turbine T $I_{IS}$: Moment of inertia of input shaft IS $I_S1$: Moment of inertia of first sun gear S1 of first planetary gear train PG1

$I_{R1}$: Moment of inertia of first ring gear R1 of first planetary gear train PG1

$I_{S2}$: Moment of inertia of second sun gear S2 of second planetary gear train PG2

$I_{C2}$: Moment of inertia of second carrier C2 of second planetary gear train PG2

$I_{R2}$: Moment of inertia of second ring gear R2 of second planetary gear train PG2

$I_{TF}$: Moment of inertia of transfer shaft TFS $I_{DF}$: Moment of inertia of output shaft OUT $I_C$: Moment of inertia of transmission case TMC $I_E$: Moment of inertia of engine E In this case, Equations 1 to 3 are relationship formulas of the angular velocities and the gear ratios of the rotary elements that constitute the planetary gear trains of the transmission TM.

Equations 4 and 5 are relationship formulas of the angular velocities and the gear ratios of the constituent elements that constitute a power transmission route from the output element of the transmission TM to the output shaft OUT connected to the wheel WH among the powertrain components.

Equations 6 to 8 are relationship formulas of the torques and the gear ratios of the rotary elements that constitute the planetary gear trains of the transmission TM.

Equation 9 is a relationship formula of the torques and the gear ratios of the rotary elements, i.e., the impeller IMP and the turbine T that constitute the torque converter TC.

Equations 10 to 21 are relationship formulas of the angular acceleration, the moment of inertia, and the torque for each stiffness connection unit of the powertrain components.

Figure 3:
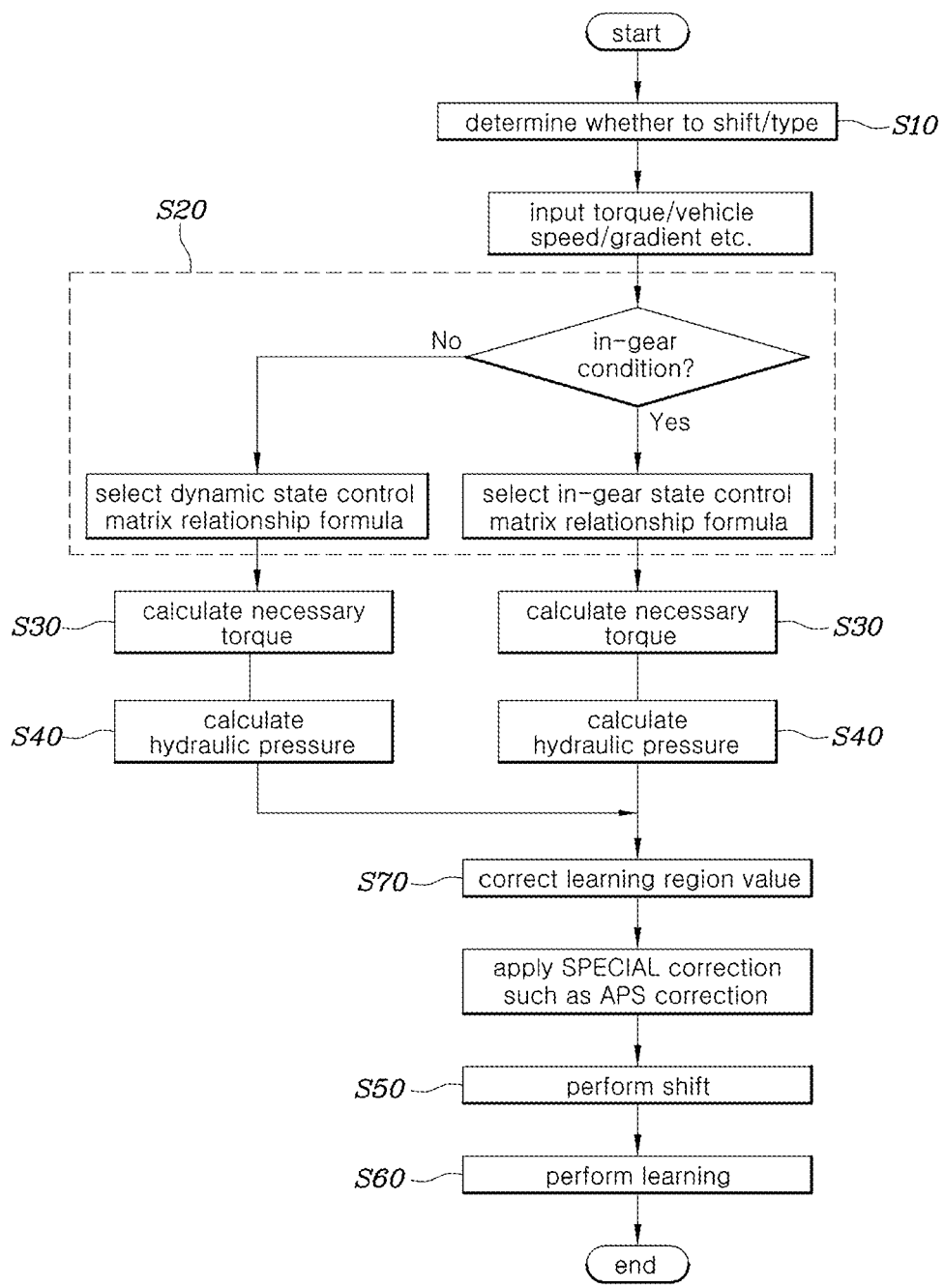
FIG. 3 is a flowchart illustrating a basic shift control method according to the present disclosure.

With reference to FIG. 3, the basic shift control method of the present disclosure includes step S10 of determining, by the controller CLR, whether the transmission TM is shifting and determining the type of shifting when the transmission TM is shifting, step S20 of selecting a predetermined control matrix H depending on whether the transmission TM is shifting and the type of shifting, step S30 of calculating a necessary torque of a control target shift element on the basis of the selected control matrix H, step S40 of calculating a control hydraulic pressure for implementing the necessary torque of the control target shift element, and step S50 of controlling the control target shift element by using the calculated control hydraulic pressure.

Of course, the above-mentioned series of steps are continuously and repeatedly performed while the shift process is performed and while the vehicle travels.

The control matrix H is calculated by using the relationship formulas, such as Equations 1 to 21, of the angular velocities, the angular accelerations, the moments of inertia, and the torque of the powertrain components and using a boundary condition according to a state of the transmission TM.

The control matrix H is calculated by multiplying a reverse matrix of an angular acceleration dominant matrix A_G, which includes coefficients of angular acceleration terms of the relationship formulas, by an external torque dominant matrix C_G including coefficients of external torque terms of the relationship formulas.

In this case, the external torques are torques that may be controlled by the controller CLR or inputted to the powertrain from the outside. In Equations 1 to 21, there are a total of thirteen types of torques, i.e., the turbine T torque $T_T$, the traveling resistance torque $T_{RD}$, the damper clutch DC torque $T_{DC}$, the over-drive clutch ODC torque $T_{OD}$, the under-drive clutch torque $T_{UD}$, the 46-clutch 46C torque $T_{46}$, the 28-brake 28B torque $T_{28}$, the 37R-clutch 37RC torque $T_{37R}$, the low-reverse brake torque $T_{LR}$, the engine E torque $T_E$, the input shaft IS torque $T_{IS}$, the transmission TM mounting torque $T_{MT}$, and the impeller IMP torque $T_{Imp}$.

Figure 4:
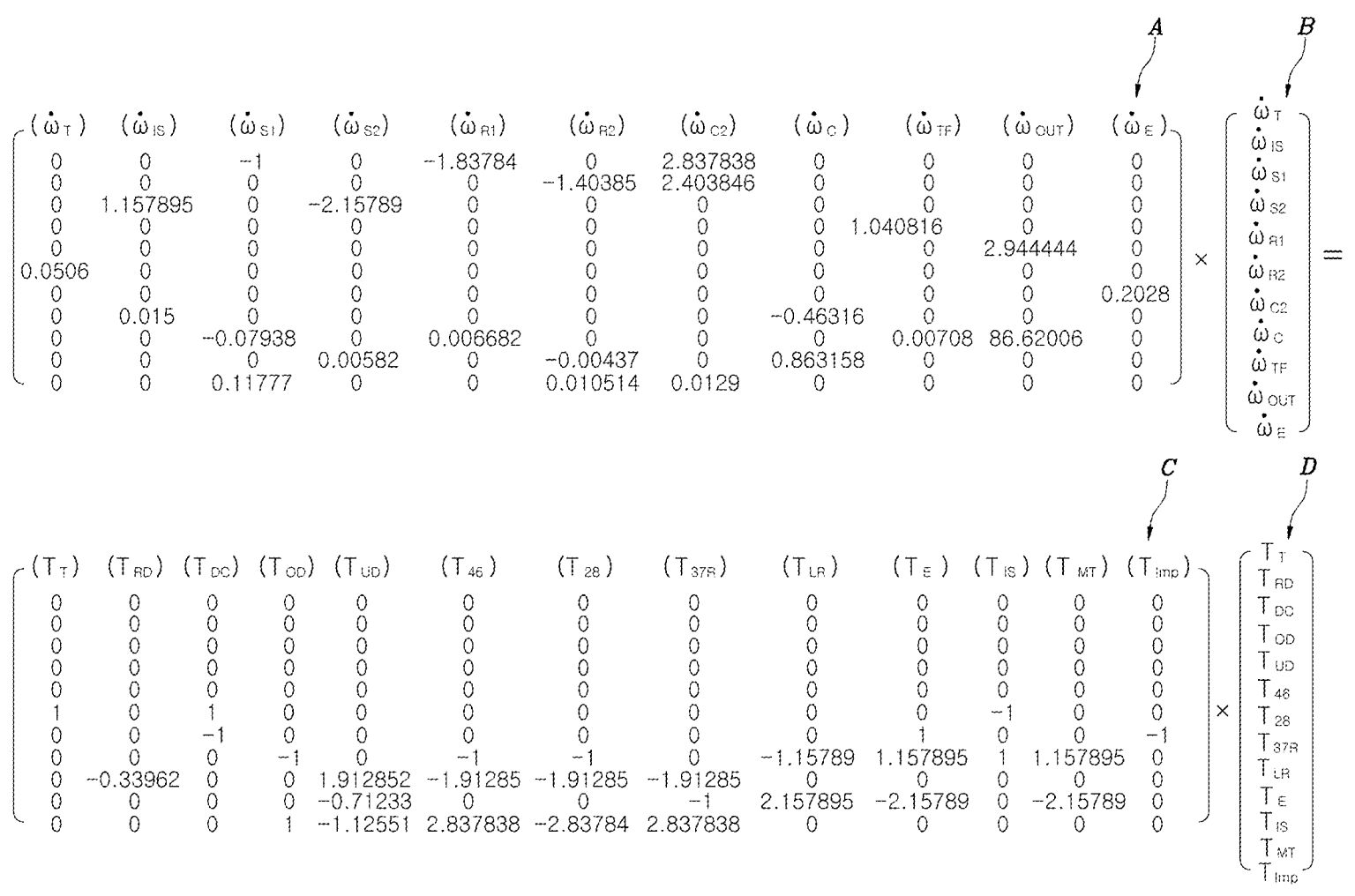

First, in order to create the angular acceleration dominant matrix A_G, a matrix formula, which represents that the product of an angular acceleration coefficient matrix A and an angular acceleration column vector B is equal to the product of an external torque coefficient matrix C and an external torque column vector D as illustrated in FIG. 4, is created by using Equations 1 to 21.

That is, the matrix formula in FIG. 4 may be expressed as A*B=C*D.

For reference, in FIG. 4, the parenthesis at the top side of the angular acceleration coefficient matrix A refers to the reference numeral representing which angular acceleration the coefficients in that column correspond to, and the parenthesis at the bottom side of the external torque coefficient matrix refers to the reference numeral representing which external torque the coefficients in that column correspond to.

Specifically, in the case of Equations 1 to 5, the method of creating the angular acceleration coefficient matrix A is performed by changing these equations into angular acceleration relationship formulas by differentiating these equations, shifting all terms to the left-hand side, making the right-hand side zero, and writing the angular acceleration terms placed on the left-hand side in the form of the product of the angular acceleration coefficient matrix and the angular acceleration column vector.

In the angular acceleration coefficient matrix A in FIG. 4, the five rows at the top side are made by writing Equations 1 to 5 with the above-mentioned method.

In this case, the product of the angular acceleration coefficient matrix and the angular acceleration column vector is represented on the left-hand side based on the equal sign, such that all values on the right-hand side are zero. However, the product of the angular acceleration coefficient matrix and the angular acceleration column vector is expressed as the product of the external torque coefficient matrix and the external torque column vector in which values of all the factors are zero, and then the angular acceleration coefficient matrix and the external torque coefficient matrix related to Equations 6 to 21 are prepared to be respectively merged into the bottom sides of the angular acceleration coefficient matrix and the external torque coefficient matrix related to Equations 1 to 5.

Meanwhile, in the case of Equations 6 to 21, in addition to the terms of the external torque representing the external torque, the terms of the internal torque, which are terms representing the remaining torques, are included. Six organized relationship formulas including the terms of the angular accelerations of the powertrain components and the terms of the external torque are calculated by eliminating and organizing the terms of the internal torque and the terms of the angular acceleration, which are in a logarithmic relationship.

In a state in which only the terms of the angular acceleration are placed on the left-hand side and only the terms of the external torque are placed on the right-hand side based on the equal signs in the six organized relationship formulas calculated as described above, the left-hand side is expressed as the product of the angular acceleration coefficient matrix and the angular acceleration column vector, and the right-hand side is expressed as the product of the external torque coefficient matrix and the external torque column vector. Therefore, it is possible to obtain the matrix formula, in which a control target vehicle powertrain is modeled as illustrated in FIG. 4, by respectively merging the organized relationship formulas into the bottom sides of the angular acceleration coefficient matrix and the external torque coefficient matrix related to Equations 1 to 5.

For reference, in the present embodiment, the internal torque includes the first sun gear S1 torque $T_S1$ of the first planetary gear train PG1, the first ring gear R1 torque $T_{R1}$ of the first planetary gear train PG1, the second sun gear S2 torque $T_{S2}$ of the second planetary gear train PG2, the second ring gear R2 torque $T_{R2}$ of the second planetary gear train PG2, the third sun gear S3 torque $T_{S3}$ of the third planetary gear train PG3, the third ring gear R3 torque $T_{R3}$ of the third planetary gear train PG3, the transfer gear torque $T_{TF}$, the output shaft OUT torque $T_{OUT}$, the transmission TM mounting torque $T_{MT}$, and the like.

As described above, FIG. 4 illustrates a state in which the angular acceleration terms of Equations 1 to 21 are separated in the form of the product of the angular acceleration coefficient matrix A and the angular acceleration column vector B and placed on one side of the equal sign, and the external torque terms of the relationship formulas are separated in the form of the product of the external torque coefficient matrix C and the external torque column vector D and placed on the other side.

Figure 5:
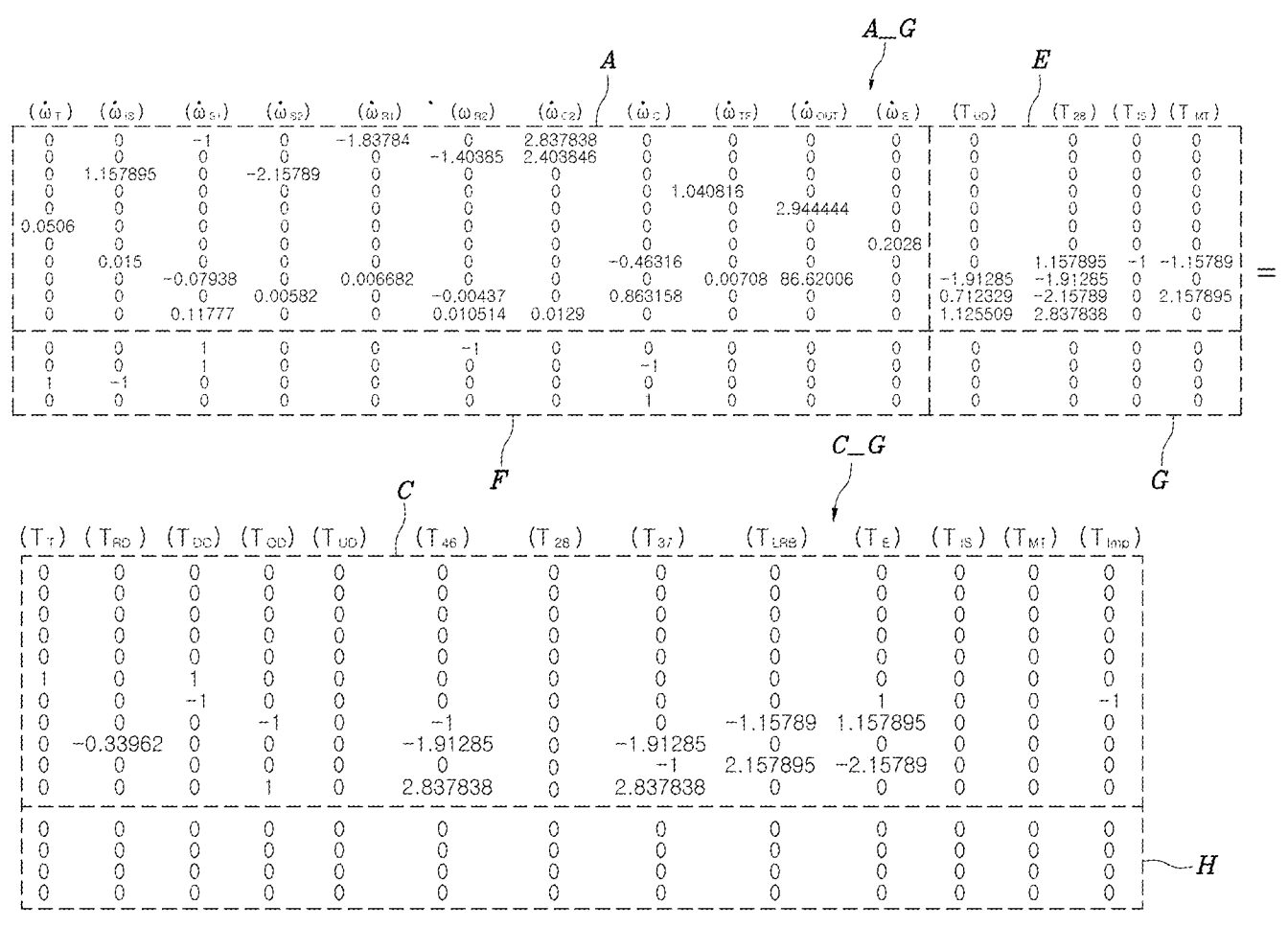

In this case, as illustrated in FIG. 5, among the external torque coefficient matrices, the angular acceleration dominant matrix A_G is configured as a square matrix created by a process of connecting and placing, to the right side of the angular acceleration coefficient matrix A, a stiffness connection matrix E created by multiplying, by -1, the columns of the coefficients for the external torque terms that may be considered as linear variables that vary depending on torque inputted to the powertrain by treating the powertrain components as completely connected; a process of connecting and placing, at the bottom side of the angular acceleration coefficient matrix A, a boundary condition matrix F including rows representing boundary conditions according to the state of the transmission TM; and a process of disposing a dummy matrix G, which is filled with zero, at a position at which the boundary condition matrix F and the stiffness connection matrix E of the angular acceleration coefficient matrix A intersect.

FIG. 5 illustrates that the stiffness connection matrix E, the boundary condition matrix F, and the dummy matrix G are connected to the angular acceleration coefficient matrix, and the angular acceleration column vector B and the external torque column vector D on both sides are omitted to avoid complexity in the matrix formula in FIG. 4.

For reference, for convenience of understanding, the above-mentioned angular acceleration column vector B is expressed as described above. However, the acceleration column vector B needs to be substantially understood as a state column vector J or B' to be described below.

Meanwhile, in FIG. 5, the right-hand side represents the external torque dominant matrix C_G. Among the external torque coefficient matrices C in FIG. 4, the external torque dominant matrix C_G includes the dummy matrix H in which the columns used for the stiffness connection matrix E are filled with zero, and the rows corresponding to the boundary condition matrix F of the angular acceleration dominant matrix A are filled with zero.

In FIG. 5, the external torques related to the coefficients of the stiffness connection matrix E are the under-drive clutch UDC torque, the 28-brake 28B torque, the input shaft IS torque, and the transmission TM mounting torque. These torques correspond to the external torques that may be considered as linear variables that vary depending on the torque inputted to the powertrain by being treated as completely connected.

The angular acceleration dominant matrix in FIG. 5 represents a second forward shift position in-gear state of the transmission TM. As illustrated in FIG. 2, the under-drive clutch UDC and the 28-brake 28B may be treated as completely connected because the under-drive clutch UDC and the 28-brake 28B are engaged at a second forward shift position. The input shaft IS may be treated as completely connected by ignoring the elastic deformation component thereof, and the transmission TM may also be treated as completely connected and mounted without elastic deformation. Therefore, the stiffness connection matrix E is configured by shifting the coefficients of the external torques to the left-hand side.

In addition, the boundary condition matrix F is created on the basis of a condition in which the first sun gear S1 and the second ring gear R2 connected to each other by the under-drive clutch UDC are equal in angular acceleration to each other because the transmission TM is in a second forward shift position in-gear state, the under-drive clutch UDC is engaged, and the 28-brake 28B is engaged, the angular acceleration of the first sun gear S1 is equal to the angular acceleration of the transmission case TMC because the 28-brake 28B is in the engaged state, the turbine T is connected directly to the input shaft IS, the angular acceleration of the turbine T is equal to the angular acceleration of the input shaft IS when the elastic deformation of the input shaft IS is ignored, and the angular acceleration of the transmission case TMC is zero.

That is, because the first sun gear S1 and the second ring gear R2 are equal in angular acceleration to each other, $\dot{\omega}_{S1} = \dot{\omega}_{R2}$. Because the angular acceleration of the first sun gear S1 is equal to the angular acceleration of the transmission case TMC, $\dot{\omega}_{S1} = \dot{\omega}_C$. Because the angular acceleration of the turbine T is equal to the angular acceleration of the input shaft IS, $\dot{\omega}_T = \dot{\omega}_{IS}$. Because the angular acceleration of the transmission case TMC is zero, $\dot{\omega}_C = 0$.

The coefficients, which are obtained by shifting all the terms in the four equations to the right-hand sides, constitute the boundary condition matrix F.

Therefore, it can be said that the angular acceleration dominant matrix A_G includes the angular acceleration coefficient matrix that is separated when the angular acceleration terms placed on one side are separated in the form of the product of the angular acceleration coefficient matrix and the angular acceleration column vector in a state in which the relationship formula of the angular velocities and the gear ratios of the rotary elements, which constitute the planetary gear trains of the transmission TM, are differentiated and changed into the angular acceleration relationship formula, and the other side is made zero by shifting all the terms to one side.

In addition, it can be said that the angular acceleration dominant matrix A_G includes the angular acceleration coefficient matrix that is separated when the angular acceleration terms placed on one side are separated in the form of the product of the angular acceleration coefficient matrix and the angular acceleration column vector in a state in which the relationship formula of the angular velocities and the gear ratios of the constituent elements, which constitute the power transmission route from the output element of the transmission TM, among the powertrain components, to the output shaft OUT connected to the wheel WH is differentiated and changed into the angular acceleration relationship formula, and the other side is made zero by shifting all the terms to one side.

In addition, it can be said that the angular acceleration dominant matrix A_G includes the angular acceleration coefficient matrix that is separated when the angular acceleration terms placed on one side are separated in the form of the product of the angular acceleration coefficient matrix and the angular acceleration column vector in a state in which the organized relationship formulas including the terms of the angular accelerations of the powertrain components and the terms of the external torques are calculated from the relationship formula of the torques and the gear ratios of the rotary elements constituting the planetary gear trains of the transmission TM, the relationship formula of the torques and the gear ratios of the rotary elements constituting the torque converter TC, and the relationship formula of the angular accelerations, the moments of inertia, and the torques of the powertrain components, and the terms of the angular accelerations and the terms of the external torques in the organized relationship formulas are distributed and placed on both sides.

The control matrix H may be obtained by obtaining a reverse matrix of the angular acceleration dominant matrix A_G obtained as described above and multiplying the external torque dominant matrix by the reverse matrix.

The control matrices H include in-gear state control matrices H related to an in-gear state in which the transmission TM is not shifting, and dynamic state control matrices H related to a state in which in which the transmission TM is shifting.

That is, the in-gear state control matrices H are provided one by one for each shift position that may be implemented by the transmission TM. The dynamic state control matrices H are provided one by one for each shift element continuously kept in the engaged state during the shift process.

In case that the transmission TM is shifting, the controller CLR selects the control matrix H for the shift element that is continuously kept in the engaged state before and after the shift process, among the dynamic state control matrices H. In case that the transmission TM is not shifting, the controller CLR selects the in-gear state control matrix H provided for each shift position.

Therefore, it can be said that in order to control the transmission TM of the powertrain in FIG. 1, as illustrated in FIG. 2, the control matrices H in the in-gear state for the first to eighth shift positions, the dynamic state control matrix H with the under-drive clutch UDC in the engaged state, the dynamic state control matrix H with the over-drive clutch ODC in the engaged state, the dynamic state control matrix H with the 37R-clutch 37RC in the engaged state, and the dynamic state control matrix H with the 28-brake 28B in the engaged state are required, and thus at least or a total of twelve control matrices H are required.

In this case, the dynamic state control matrix H with the 37R-clutch 37RC in the engaged state and the dynamic state control matrix H with the 28-brake 28B in the engaged state may be understood as the dynamic state control matrices H related to the shift elements continuously kept in the engaged state during a skip-shift process in which the shift process is performed by skipping an intermediate shift position.

Figure 6:
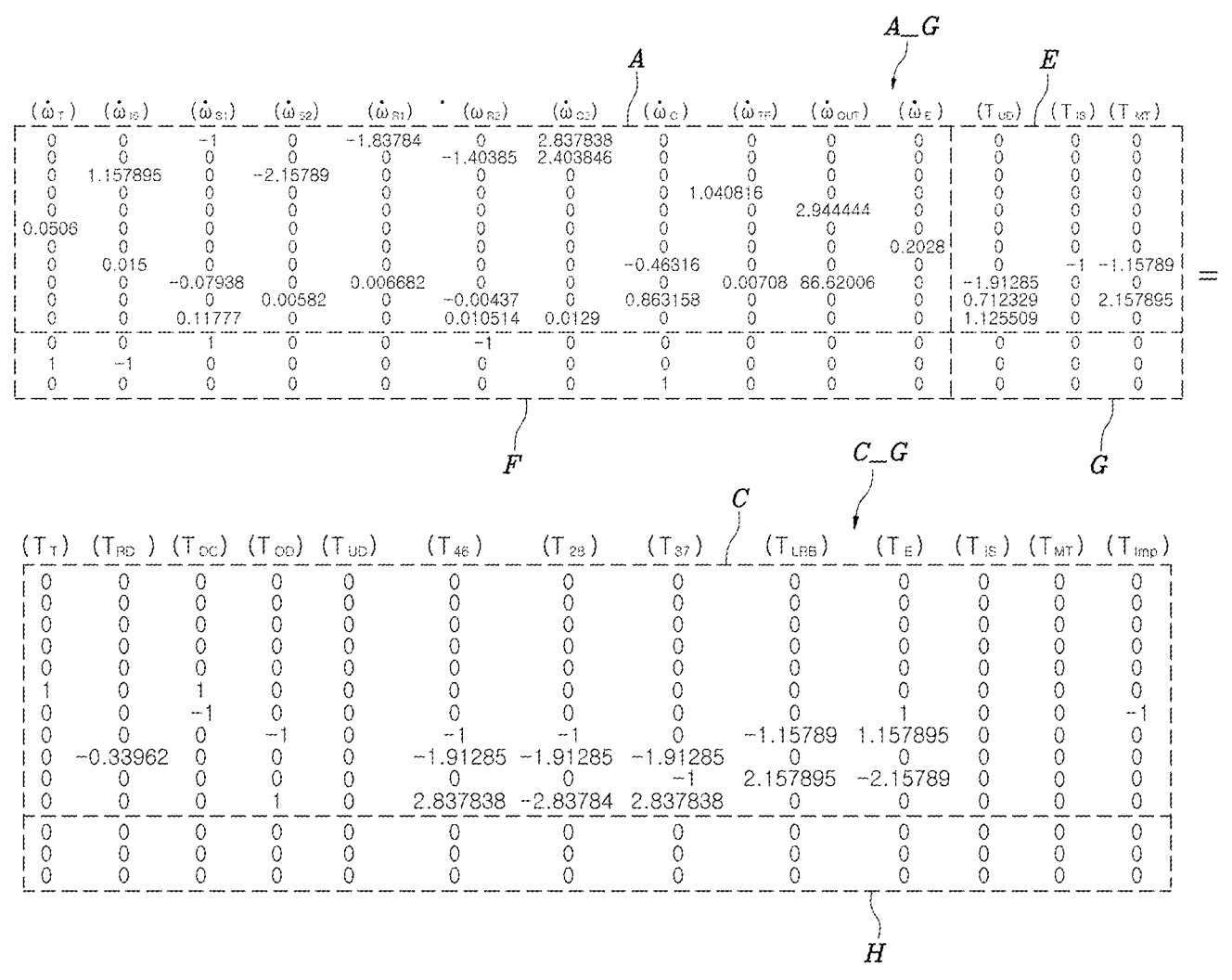

For reference, FIG. 6 is a view illustrating the relationship between the angular acceleration dominant matrix A_G and the external torque dominant matrix C_G for obtaining the dynamic state control matrix H with the under-drive clutch UDC in the engaged state in a state in which the angular acceleration column vector and the external torque column vector are omitted, as illustrated in FIG. 5.

Therefore, the dynamic state control matrix H with the under-drive clutch UDC in the engaged state by obtaining a reverse matrix of the angular acceleration dominant matrix A_G on the left-hand side in FIG. 6 and multiplying the external torque dominant matrix C_G on the right-hand side by the reverse matrix.

The necessary torque of the control target shift element is calculated on the basis of the relationship formula of the control matrix H representing that the value made by multiplying the right side of the control matrix H by the external torque column vector D is equal to the state column vector J in which the angular accelerations and the external torques corresponding to the respective columns of the angular acceleration dominant matrix A_G are sequentially arranged.

In this case, the state column vector J is created by sequentially connecting the external torques related to the coefficients of the stiffness connection matrix E to the bottom side of the angular acceleration column vector B.

Substantially, the column vector, by which the right side of the angular acceleration dominant matrix on the left-hand side in FIG. 5 is the state column vector J instead of the angular acceleration column vector.

That is, because the angular acceleration dominant matrix A_G in FIG. 5 is created by connecting the stiffness connection matrix E to the right side of the angular acceleration coefficient matrix A in FIG. 4, the external torques multiplied by the coefficients of the stiffness connection matrix E need to be included in the bottom side of the angular acceleration column vector B expressed in the form of the product of the angular acceleration dominant matrix A_G and the angular acceleration column vector B, such that the state column vector J is created as described above.

Figure 7:
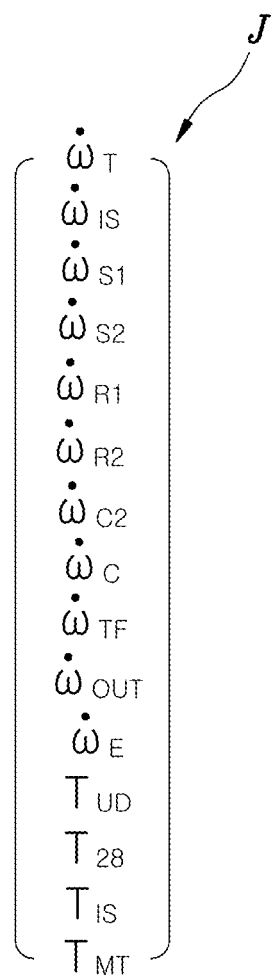
FIG. 7 is a view illustrating the state column vector omitted from FIG. 5.
Figure 8:
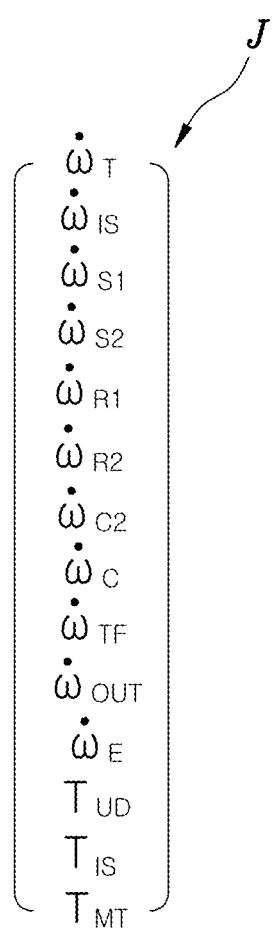
FIG. 8 is a view illustrating the state column vector omitted from FIG. 6.

FIG. 7 is a view illustrating the state column vector J omitted from FIG. 5, and FIG. 8 is a view illustrating the state column vector J omitted from FIG. 6.

The relationship formula of the control matrix H for calculating a necessary torque of a release-side shift element, among the control target shift element, uses the in-gear state control matrix H at the current shift position as the control matrix H.

For example, in case that the transmission TM in FIG. 1 shifts from the second shift position to the third shift position, the transmission TM performs the shift process by releasing the 28-brake 28B and engaging the 37R-clutch 37RC while continuously maintaining the under-drive clutch in the engaged state, as illustrated in FIG. 2.

Therefore, in this case, the relationship formula of the control matrix H for calculating the necessary torque of the 28-brake 28B, which is the release-side shift element, uses the in-gear state control matrix H at the second shift position, which is the current shift position, as the control matrix H.

For reference, FIG. 9 illustrates the relationship formula of the control matrix H that uses the in-gear state control matrix H at the second shift position. The necessary torque of the 28-brake 28B, which is the release-side shift element, is calculated by using the relationship formula of the control matrix H.

The necessary torque of the release-side shift element is calculated by eliminating, as zero, the external torque, which is irrelevant or ignorable to the current state of the transmission TM, from the partial relationship formula representing that the value made by multiplying the external torque column vector by the row of the control matrix H identical to the row of the external torque corresponding to the torque of the release-side shift element among the rows of the state column vector J in the relationship formula of the control matrix H is equal to the necessary torque of the release-side shift element.

In this case, because the terms of the remaining external torques other than the turbine torque and the traveling resistance torque are the terms of the external torques irrelevant or ignorable to the current state of the transmission TM, the necessary torque of the release-side shift element may be calculated from the relationship formula from which the terms are eliminated as zero.

That is, in FIG. 9, the following equation may be organized and obtained by multiplying the external torque column vector by the row of the control matrix H identical to the row of the torque of the 28-brake 28B, among the rows of the state column vector J, and eliminating, as zero, the terms of the remaining external torques other than the turbine torque and the traveling resistance torque.

$$T_{28} = -1.017 T_T - 0.002 T_{RD}$$

Therefore, the controller CLR may calculate the necessary torque of the 28-brake 28B, which is the release-side shift element, by inputting the turbine torque and the traveling resistance torque into the above-mentioned equation, and the controller CLR may control the 28-brake 28B by calculating the control hydraulic pressure for satisfying the calculated necessary torque.

In this case, the turbine torque and the traveling resistance torque are information that may be received from the sensor or other controllers of the vehicle.

The controller CLR uses the relationship formula of the control matrix H for calculating the necessary torque of the release-side shift element in order to calculate an engagement-side basic preparation hydraulic pressure P1 of the engagement-side shift element required to prevent a shifting sag phenomenon immediately before the shift initiation of the transmission TM.

That is, the controller CLR calculates the angular acceleration of the output shaft OUT after eliminating, as zero, the terms of the remaining external torques other than the turbine torque and the traveling resistance torque, among the terms of the external torques, from the partial relationship formula representing that the value made by multiplying the external torque column vector by the row of the control matrix H, which is identical to the row of the angular acceleration of the output shaft OUT connected to the wheel WH of the state column vector J in the relationship formula of the control matrix H, is equal to the angular acceleration of the output shaft OUT.

This is represented by the following equation:

$$\dot{\omega}_{OUT} = 0.034 T_T - 0.004 T_{RD}$$

In this case, the shifting sag phenomenon is a phenomenon in which the acceleration of the vehicle decreases transitorily excessively immediately before the shift initiation. The shifting sag phenomenon tends to occur because the control hydraulic pressure of the engagement-side shift element is approximately and somewhat excessively applied and the angular acceleration of the output shaft OUT of the vehicle decreases transitorily excessively.

Therefore, the necessary torque of the engagement-side shift element, which decreases the angular acceleration of the output shaft OUT only by about 5%, is calculated, and the engagement-side shift element is controlled by calculating the control hydraulic pressure on the basis of the necessary torque of the engagement-side shift element, such that the excessive decrease in angular acceleration of the output shaft OUT may be prevented, and eventually the shifting sag phenomenon may be reduced or prevented.

To this end, according to the present embodiment, in order to calculate the engagement-side basic preparation hydraulic pressure P1 of the 37R-clutch 37RC that is the engagement-side shift element required to prevent the shifting sag phenomenon, a corrected angular acceleration of the output shaft OUT, which is made by decreasing the calculated angular acceleration of the output shaft OUT by a predetermined amount of decrease in acceleration, is calculated first.

In this case, the corrected angular acceleration of the output shaft OUT may be determined as $0.95\dot{\omega}_{OUT}$ by allowing the angular acceleration of the output shaft OUT to be decreased only by 5%.

Thereafter, the torque of the engagement-side shift element is calculated in a state in which the corrected angular acceleration of the output shaft OUT is substituted with the angular acceleration of the output shaft OUT after eliminating, as zero, the terms of the remaining external torques other than the turbine torque, the traveling resistance torque, and the torque of the engagement-side shift element, among the terms of the external torques, from the partial relationship formula representing that the value made by multiplying the external torque column vector by the row of the control matrix H, which is identical to the row of the angular acceleration of the output shaft OUT connected to the wheel WH of the state column vector J in the relationship formula of the control matrix H, is equal to the angular acceleration of the output shaft OUT.

That is, the above-mentioned contents are represented by the following equation $$T_{37R} = 1/0.018 \times (-0.034 T_T + 0.004 T_{RD} + 0.95 \dot{\omega}_{OUT})$$

Therefore, on the basis of the above-mentioned equation, the controller CLR may calculate the necessary torque of the 37R-clutch 37RC for preventing the shifting sag phenomenon, calculate the control hydraulic pressure for implementing the calculated torque of the engagement-side shift element, determine the engagement-side basic preparation hydraulic pressure P1 of the engagement-side shift element required to prevent the shifting sag phenomenon, and control the engagement-side shift element with the engagement-side basic preparation hydraulic pressure P1 immediately before the shift process, thereby preventing or reducing the shifting sag phenomenon, improving the shift quality of the vehicle, and ultimately improving the marketability of the vehicle.

Meanwhile, the controller CLR may calculate the control hydraulic pressure of the shift element for maintaining the in-gear state of the transmission TM on the basis of the relationship formula of the control matrix H that uses the in-gear state control matrix H, and the controller CLR may apply the control hydraulic pressure to the management of a line pressure of the hydraulic system of the transmission TM.

For example, because the line pressure for maintaining the under-drive clutch torque is required in the in-gear state at the second shift position, the controller CLR may calculate the under-drive clutch torque by using the relationship formula corresponding to the row of the under-drive clutch torque in the state column vector J in FIG. 9 and then calculate the control hydraulic pressure to be provided to the under-drive clutch, thereby calculating the line pressure, which is maintained in the hydraulic system of the transmission TM, on the basis of the control hydraulic pressure.

That is, the controller CLR may calculate the necessary torque of the under-drive clutch by using the following relationship formula:

$$T_{UD} = 2.563 T_T + 0.006 T_{RD}$$

The relationship formula of the control matrix H, which is used to calculate the necessary torque of the engagement-side shift element among the control target shift elements, uses, as the control matrix H, the dynamic state control matrix H related to the shift element that is continuously kept in the engaged state before and after the corresponding shift process.

That is, because the shift element, which is continuously kept in the engaged state before and after the shift process, is the under-drive clutch in case that the transmission shifts from the second shift position to the third shift position, the relationship formula of the control matrix H uses the dynamic state control matrix H related to the under-drive clutch as the control matrix H.

FIG. 10 illustrates the relationship formula of the control matrix H that uses the dynamic state control matrix H related to the under-drive clutch as the control matrix H.

The engagement-side basic target torque of the engagement-side shift element for entering an inertia phase IP in which the angular velocity of the turbine T begins to decrease, among the necessary torques of the engagement-side shift element, is determined as an engagement-side basic target torque of the engagement-side shift element by calculating the torque of the engagement-side shift element from the relationship formula made by setting the turbine T angular acceleration to zero and eliminating, as zero, the terms of the remaining external torques other than the turbine torque, the traveling resistance torque, and the torque of the engagement-side shift element, among the terms of the external torques from the partial relationship formula representing that the value made by multiplying the external torque column vector by the row of the control matrix H, which is identical to the row of the angular acceleration of the turbine T among the rows of the state column vector J in the relationship formula of the control matrix H, is equal to the angular acceleration of the turbine T.

That is, the engagement-side basic target torque of the 37R-clutch 37RC, which is the engagement-side shift element, may be calculated on the basis of the following equation:

$$T_{37R} = 1/13.23 \times (8.901 T_T - 0.014 T_{RD})$$

For reference, in this equation, the angular acceleration $\dot{\omega}_T$ of the turbine T is set to zero.

In this case, the angular acceleration of the turbine T is set to zero because during a power-on up-shift process, the angular velocity of the turbine T increases over time during the torque phase and then begins to decrease during the inertia phase IP, and thus the torque of the engagement-side shift element, when the angular velocity of the turbine T is a maximum value during the corresponding shift process, may be considered as the engagement-side basic target torque of the corresponding engagement-side shift element.

Of course, the engagement-side basic target torque is converted into an engagement-side basic target pressure P4 for achieving the engagement-side basic target torque and provided to the 37R-clutch 37RC that is the engagement-side shift element.

The controller CLR calculates a PID torque, which is the torque of the engagement-side shift element to be changed after controlling the engagement-side shift element to the engagement-side basic target torque in a state in which a target change rate of the turbine T per unit time is substituted with the angular acceleration of the turbine T after eliminating, as zero, the terms of the remaining external torques other than the turbine torque, the traveling resistance torque, and the torque of the engagement-side shift element, among the terms of the external torques, from the partial relationship formula of the relationship formula of the control matrix H used to obtain the necessary torque of the engagement-side shift element.

That is, the engagement-side shift element is the 37R-clutch 37RC in the example in which the transmission shifts from the second shift position to the third shift position, and this is represented by the following equation:

$$T_{37R\_PID} = 1/13.23 \times (8.901 T_T - 0.014 T_{RD} - \Delta\dot{\omega}_T)$$

Here, $T_{37R\_PID}$ represents the PID torque of the engagement-side shift element, and $\Delta\dot{\omega}_T$ represents the target change rate of the turbine T per unit time and is calculated by dividing the angular velocity of the turbine T, which is to be changed for a shift target time, by the shift target time. The controller CLR may calculate the shift target time and the angular velocity of the turbine T, which is to be changed for the shift target time, by using a publicly-known technology in the related art in consideration of the corresponding shift situation.

The controller CLR corrects the PID torque by using, as a feedback component, a difference between a measurement value and a target value of the angular acceleration of the turbine T during the inertia phase IP and calculates the hydraulic pressure for implementing the corrected PID torque of the engagement-side shift element, thereby repeatedly determining a PID control hydraulic pressure that the engagement-side shift element needs to change for the shift target time.

Meanwhile, the controller CLR calculates the turbine torque in a state in which a target change rate of the turbine T per unit time is substituted with the angular acceleration of the turbine T after eliminating, as zero, the terms of the remaining external torques other than the turbine torque, the traveling resistance torque, and the torque of the engagement-side shift element, among the terms of the external torques, from the partial relationship formula of the relationship formula of the control matrix H used to obtain the necessary torque of the engagement-side shift element, and the controller CLR performs an engine torque reduction request by using a value made by dividing the turbine torque by a torque amplification ratio of the torque converter TC.

That is, in order to perform the engine torque reduction (ETR) request required during the shift process, the controller CLR may calculate the turbine torque, as described above, and perform the engine torque reduction request on the basis of the turbine torque.

For example, the relationship formula for calculating the turbine torque may be represented as follows:

$$T_T (\Delta\dot{\omega}_T + 0.014 T_{RD} + 13.23 T_{37R})$$

Meanwhile, in case that the controller CLR has performed the shift process by controlling the control target shift element, the controller CLR performs step S60 of learning a difference between the control target and the actual shift state and performs step S70 of correcting the control hydraulic pressure on the basis of the contents learned in the learning step between step S40 of calculating the control hydraulic pressure for implementing the necessary torque of the control target shift element and step S50 of controlling the control target shift element by using the calculated control hydraulic pressure.

That is, in case that the shift process is performed by controlling the transmission TM with the control hydraulic pressure determined by the relationship formula of the control matrix H, the controller may learn the difference between the control target and the actual shift state that is bound to occur because of individual processing errors and assembling errors of the transmission TM and correct the control hydraulic pressure on the basis of the difference, thereby stably implementing model-based shift control according to the present disclosure.

For reference, as illustrated in FIG. 3, in addition to the correction of the control hydraulic pressure, special correction, such as correction according to an accelerator pedal manipulation state, may be additionally applied with reference to an acceleration position sensor (APS) output.

According to the present disclosure, when only the control matrices H, which are calculated in advance suitably for the transmission TM mounted in the vehicle, is inputted to the controller CLR, the controller may immediately calculate the angular acceleration or the external torque of the required powertrain components depending on the traveling situation of the vehicle, use the angular acceleration or the external torque for the control, and automatically perform the correction by learning. Therefore, it is possible to quickly map the control data and ensure the reliability of the control data without requiring excessive performance of the controller CLR, thereby ultimately improving the shift quality of the vehicle and improving the marketability.

In performing the shift control of the powertrain as described above, the controller CLR may divide the shift process into a series of a plurality of shift phases and perform the shift control on the basis thereof.

The shift phases may be distinguished depending on states of various shift-related physical quantities such as a timer signal, a turbine rotational speed, and a slip amount of the shift element.

The controller CLR may receive information on which shift phase the current shift process has reached from a separate determination module or the like that determines the shift phase on the basis of the data from various types of sensors that measure the above-mentioned physical quantities.

However, some of the series of shift phases may be skipped because of various hardware variables such as processing errors and assembling errors of hardware such as shift elements constituting the transmission or because of an operating oil temperature.

For example, in the case of a normal shift process between the second shift position to the third shift position, a predetermined series of shift phases, such as a first shift phase, a second shift phase, a third shift phase, and a fourth shift phase, are sequentially generated, and the determination module needs to determine the series of shift phases. However, in case that the shift-related physical quantity is very quickly changed to the extent that the change cannot be recognized by the determination module, the determination module, for example, may determine the fourth shift phase immediately after the second shift phase, such that the third shift phase may be skipped.

In this case, the controller CLR cannot recognize the third shift phase.

In this case, the controller CLR sometimes needs to depend on the data ensured in the third shift phase in order to control the fourth shift phase. However, in the situation in which the third shift phase is skipped as described above, the controller CLR may use incorrect data, such as the use of the data of the second shift phase, which may significantly degrade the shift quality.

Therefore, even in the situation in which some of the series of shift phases are skipped and it is difficult to ensure the data required for the shift control, the controller CLR needs to provide an appropriate solution for allowing the controller to perform the appropriate shift control as much as possible so that the smooth and stable shift control may be achieved.

In order to achieve the above-mentioned object, a shift control method for a vehicle powertrain according to the present disclosure includes step S40 of calculating, by the controller CLR configured to divide the shift process into a series of shift phases and perform the shift control on the basis of the shift phase, a control hydraulic pressure basic calculation value V1 for implementing the necessary torque of the control target shift element on the basis of the shift phase by using the control matrix H created from the vehicle powertrain model, step S70 of calculating a control hydraulic pressure correction calculation value V2 by correcting the control hydraulic pressure basic calculation value V1 with a correction value including a learning value related to the shift element, and step S50 of controlling the control target shift element on the basis of the control hydraulic pressure correction calculation value V2.

Figure 11:
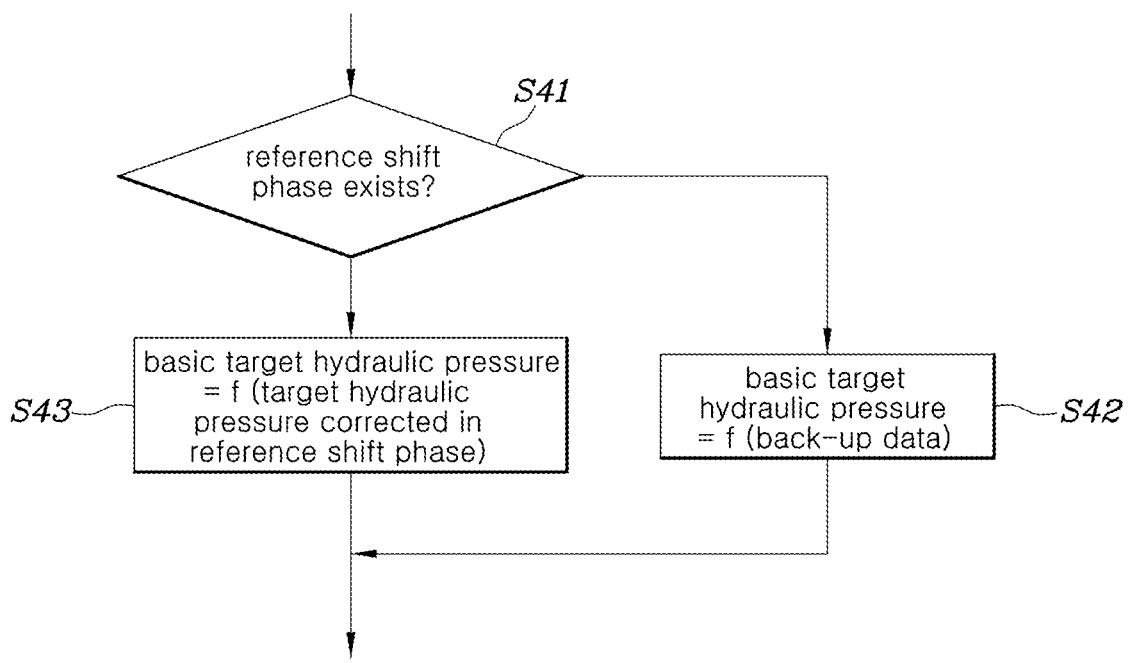
FIG. 11 is a flowchart illustrating an embodiment of the shift control method for a vehicle powertrain according to the present disclosure.

With reference to FIG. 11, in step S40 of calculating the control hydraulic pressure basic calculation value V1, the controller CLR performs step S41 of determining whether there is a predetermined reference shift phase for specifying data required to calculate the control hydraulic pressure basic calculation value V1, and the controller CLR performs step S42 of calculating the control hydraulic pressure basic calculation value V1 by using predetermined back-up data when the predetermined reference shift phase does not exist.

That is, the present disclosure is substantially a more specific method related to how to calculate the control hydraulic pressure basic calculation value V1 depending on the presence or absence of the reference shift phase in step S40 of calculating the control hydraulic pressure for implementing the necessary torque of the control target shift element in the control method illustrated in FIG. 3.

In addition, in this case, the 'control hydraulic pressure basic calculation value V1' may be understood as meaning the 'control hydraulic pressure for implementing the necessary torque of the shift element.

When the reference shift phase exists, the controller CLR performs step S43 of calculating the control hydraulic pressure basic calculation value V1 by using the control hydraulic pressure correction calculation value V2 in the reference shift phase.

In addition, the 'reference shift phase' means a preceding shift phase that needs to be referenced to control a subsequent shift phase. An immediately previous shift phase may mainly be the reference shift phase. However, the present disclosure is not limited thereto.

For example, as described above, when the series of shift phases for performing the shift process between the second shift position and the third shift position are determined as the first shift phase, the second shift phase, the third shift phase, the fourth shift phase, and the like, the reference shift phase may be the immediately previous third shift phase when the shift phase, which needs to be currently controlled by the controller CLR, is the fourth shift phase.

Hereinafter, for ease of understanding of the description, a process of controlling the engagement-side shift element during the shift process will be described with reference to FIGS. 12 and 13.

Figure 12:
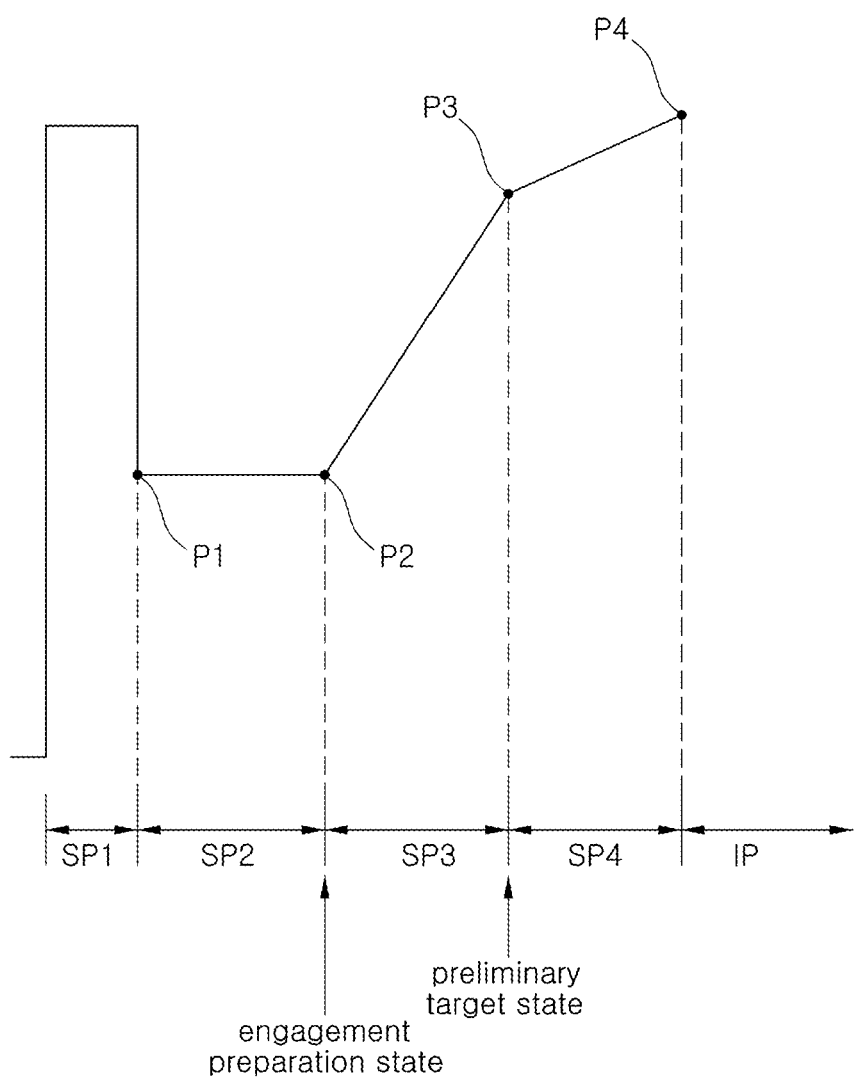
FIG. 12 is a view illustrating a typical example of a control hydraulic pressure applied to engagement-side shift elements such as a clutch or a brake during a shift process.

FIG. 12 is a view illustrating a typical example of the control hydraulic pressure applied to the engagement-side shift element such as a clutch or brake during the shift process. When the shift process is initiated, a fill-time phase SP1, which quickly fills the engagement-side shift element with the hydraulic pressure, is performed, and then a hydraulic-pressure-preparation phase SP2 is performed. The hydraulic pressure reaches the engagement-side basic target pressure P4 through a first shift-initiation phase SP3 and a second shift-initiation phase SP4. Thereafter, the inertia phase IP, which decreases the angular velocity of the turbine and converges the angular velocity of the turbine to a target shift position velocity, is performed.

For reference, the inertia phase IP may be divided into a plurality of shift phases again. In this case, the plurality of shift phases will not be specifically described.

P1 represents the control hydraulic pressure at which the fill-time phase SP1 is ended and the hydraulic-pressure-preparation phase SP2 is started. Substantially, P1 corresponds to the engagement-side basic preparation hydraulic pressure P1 of the engagement-side shift element required to prevent the shifting sag phenomenon immediately before the shift initiation.

P2 represents the control hydraulic pressure in the engagement preparation state in which the hydraulic-pressure-preparation phase SP2 is ended and the first shift-initiation phase SP3 is started. P2 may be equal to P1. P2 may be a value that is gradually and constantly increased over time from P1 to prepare for hardware deviations or instability of the engagement-side shift element.

P4 represents the engagement-side basic target pressure P4 calculated as the hydraulic pressure of the engagement-side shift element when the angular acceleration of the turbine becomes zero. P3 represents a hydraulic pressure of the engagement-side shift element in a preliminary target state, i.e., an engagement-side preliminary target pressure P3 reduced by multiplying the engagement-side basic target pressure P4 by a predetermined buffer coefficient.

The engagement-side basic target pressure P4 may be a hydraulic pressure of the engagement-side shift element for making the turbine angular acceleration zero. The situation in which the turbine angular acceleration becomes zero means that the turbine angular velocity increases as the shift process is performed and then the turbine angular velocity becomes a maximum value that begins to decreases. Eventually, the turbine angular velocity may be the control hydraulic pressure of the engagement-side shift element at which the turbine angular velocity stops increasing and begins to decrease as the engagement-side clutch is engaged.

In addition, the engagement-side preliminary target pressure P3 is set to a pressure that is relatively slightly lower than the engagement-side basic target pressure P4 because shift impact or the like may occur when the engagement-side shift element is immediately raised to the engagement-side basic target pressure P4. Therefore, first, the controller CLR raises the control hydraulic pressure of the engagement-side shift element to the engagement-side preliminary target pressure P3 at a relatively high gradient (corresponding to the first shift-initiation phase SP3) and then raises the control hydraulic pressure to the engagement-side basic target pressure P4 at a relatively low gradient (corresponding to the second shift-initiation phase SP4), thereby preventing the shift impact and promoting the smooth and seamless shift process.

Therefore, the buffer coefficient may be a value less than 1. For example, when the buffer coefficient is set to 0.95, the engagement-side preliminary target pressure P3 is set to a value at a 95% level of the engagement-side basic target pressure P4.

For reference, the shift process illustrated in FIG. 12 may include the series of shift phases including the fill-time phase SP1, the hydraulic-pressure-preparation phase SP2, the first shift-initiation phase SP3, the second shift-initiation phase SP4, and the inertia phase IP.

In addition, the first shift-initiation phase SP3 may be considered as the shift phase in which the engagement-side shift element changes from the engagement preparation state to the preliminary target state.

Figure 13:
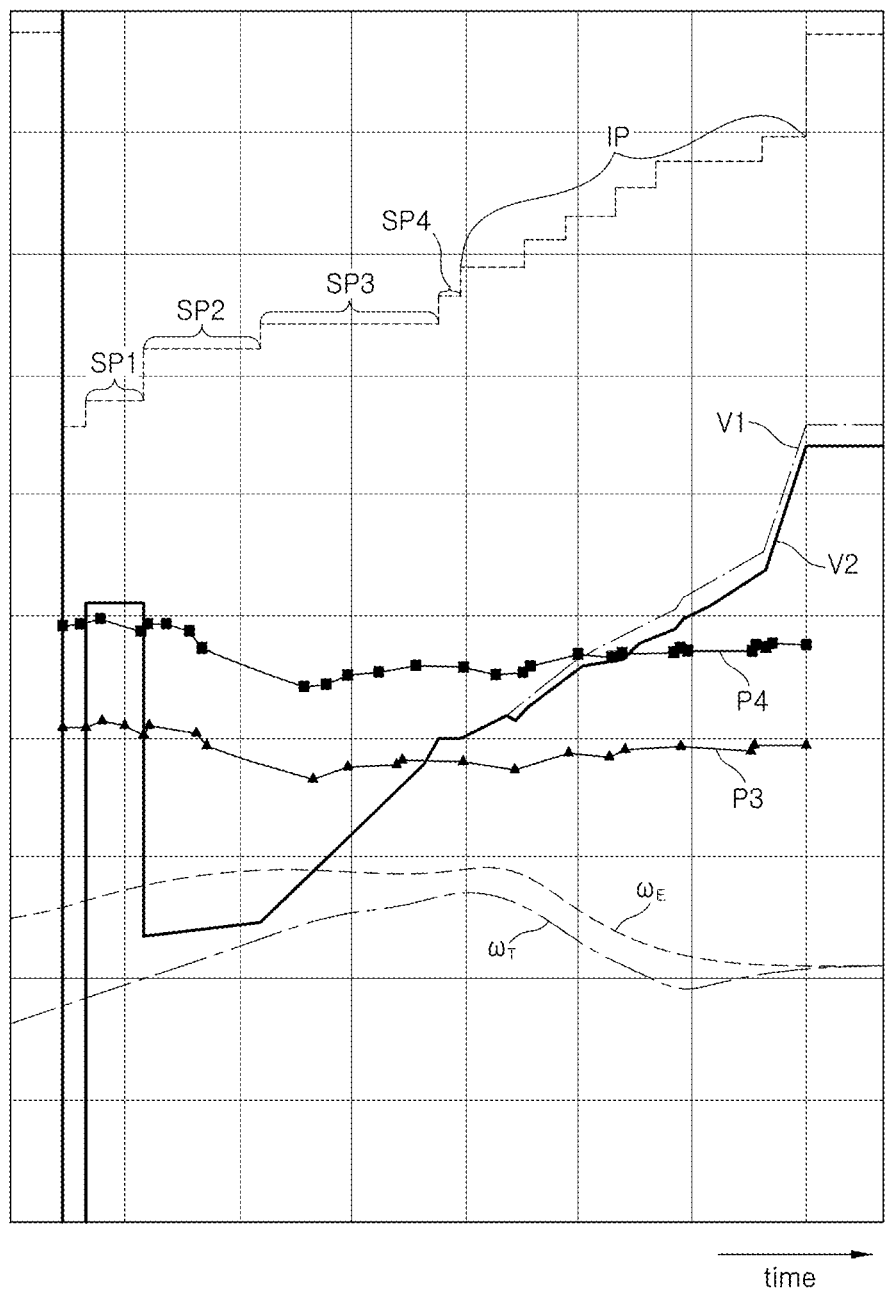
FIG. 13 is a graph illustrating a general shift process according to an elapse of time.

FIG. 13 is a graph illustrating the shift process over time and illustrates a change of the series of shift phases over time, a change of the control hydraulic pressure basic calculation value V1, a change of the control hydraulic pressure correction calculation value V2, a change of the engagement-side basic target pressure P4, a change of the engagement-side preliminary target pressure P3, a change of the engine angular velocity $\omega_E$, and a change of the turbine angular velocity $\omega_T$.

In this case, the controller CLR calculates the control hydraulic pressure basic calculation value V1 on the basis of the reference shift phase, the engagement-side basic target pressure P4, the engagement-side preliminary target pressure P3, the control matrix H, and various types of data of the vehicle.

That is, the controller CLR has a map related to what shift process to make, for how long, and in what form to control the engagement-side shift element, and the controller CLR may be calculated, in real time, the control hydraulic pressure basic calculation value V1 by inputting various types of data into the map.

The control hydraulic pressure correction calculation value V2 is obtained by correcting the control hydraulic pressure basic calculation value V1 with a correction value including a learning value for the shift element.

The learning value for the shift element may be calculated on the basis of the data learned during the previous shift process.

Further, in addition to the above-mentioned learning value for the shift element, the correction values may also include values based on special corrections such as correction based on an accelerator pedal manipulation state by referring to the acceleration position sensor (APS) output, as illustrated in FIG. 3.

The controller CLR eventually uses the control hydraulic pressure correction calculation value V2 and controls the shift element required for the shift process.

The engagement-side basic target pressure P4 is a value continuously calculated in real time by using the control matrix H depending on the current shift situation, as described above. The engagement-side preliminary target pressure P3 is a value continuously calculated by multiplying the engagement-side basic target pressure P4 by the buffer coefficient.

In case that the hydraulic-pressure-preparation phase SP2 of the engagement-side shift element, which is the reference shift phase, exists when the controller CLR calculates the control hydraulic pressure basic calculation value V1 in the engagement preparation state of the engagement-side shift element, the controller CLR calculates the control hydraulic pressure basic calculation value V1 by using the control hydraulic pressure correction calculation value V2 at the end of the hydraulic-pressure-preparation phase SP2.

That is, in order to calculate the control hydraulic pressure basic calculation value V1 in the engagement preparation state in which the controller CLR ends the hydraulic-pressure-preparation phase SP2 and intends to start the first shift-initiation phase SP3, the controller CLR calculates the control hydraulic pressure basic calculation value V1 by inputting the control hydraulic pressure correction calculation value V2 at the end of the hydraulic-pressure-preparation phase SP2, which is the reference shift phase, to the map.

Meanwhile, in case that the hydraulic-pressure-preparation phase SP2 of the engagement-side shift element, which is the reference shift phase, does not exist when the controller CLR calculates the control hydraulic pressure basic calculation value V1 in the engagement preparation state of the engagement-side shift element, the controller CLR may use the engagement-side basic preparation hydraulic pressure P1, which is calculated as the hydraulic pressure of the engagement-side shift element required to prevent the shifting sag phenomenon by using the control matrix H, as the back-up data.

That is, in case that the hydraulic-pressure-preparation phase SP2, which is the reference shift phase, is skipped and does not exist when the controller CLR intends to calculate the control hydraulic pressure basic calculation value V1 in the engagement preparation state, the controller CLR calculates the control hydraulic pressure basic calculation value V1 by inputting the engagement-side basic preparation hydraulic pressure P1 to the map instead of inputting the control hydraulic pressure correction calculation value V2 at the end of the hydraulic-pressure-preparation phase SP2.

Therefore, because the control hydraulic pressure basic calculation value V1 is calculated by using the engagement-side basic preparation hydraulic pressure P1 without using the control hydraulic pressure correction calculation value V2 to which shift progress situations and learning values accumulated up to now are applied, the comparatively stable shift control may be performed even in the situation in which the shift phase is skipped even though it is difficult to perform the optimal shift control.

In case that the first shift-initiation phase SP3 of the engagement-side shift element, which is the reference shift phase, exists when the controller CLR calculates the control hydraulic pressure basic calculation value V1 in the preliminary target state of the engagement-side shift element, the controller CLR calculates the control hydraulic pressure basic calculation value V1 by using the control hydraulic pressure correction calculation value V2 at the end of the first shift-initiation phase SP3.

That is, in order to calculate the control hydraulic pressure basic calculation value V1 in the preliminary target state in which the controller CLR ends the first shift-initiation phase SP3 and intends to start the second shift-initiation phase SP4, the controller CLR calculates the control hydraulic pressure basic calculation value V1 by inputting the control hydraulic pressure correction calculation value V2 at the end of the first shift-initiation phase SP3, which is the reference shift phase, to the map.

Meanwhile, in case that the first shift-initiation phase SP3 of the engagement-side shift element, which is the reference shift phase, exists when the controller CLR calculates the control hydraulic pressure basic calculation value V1 in the preliminary target state of the engagement-side shift element, the controller CLR may use the engagement-side preliminary target pressure P3, which is reduced by multiplying the engagement-side basic target pressure P4, which is calculated as the hydraulic pressure of the engagement-side shift element when the turbine angular acceleration becomes zero by using the control matrix H, by the predetermined buffer coefficient, as the back-up data.

That is, in case that the first shift-initiation phase SP3, which is the reference shift phase, is skipped and does not exist when the controller CLR intends to calculate the control hydraulic pressure basic calculation value V1 in the preliminary target state, the controller CLR calculates the control hydraulic pressure basic calculation value V1 by inputting the engagement-side preliminary target pressure P3 to the map instead of inputting the control hydraulic pressure correction calculation value V2 at the end of the first shift-initiation phase SP3.

Therefore, because the control hydraulic pressure basic calculation value V1 is calculated by using the engagement-side preliminary target pressure P3 without using the control hydraulic pressure correction calculation value V2 to which shift progress situations and learning values accumulated up to now are applied, the comparatively stable shift control may be performed even in the situation in which the shift phase is skipped even though it is difficult to perform the optimal shift control.

Figure 14:
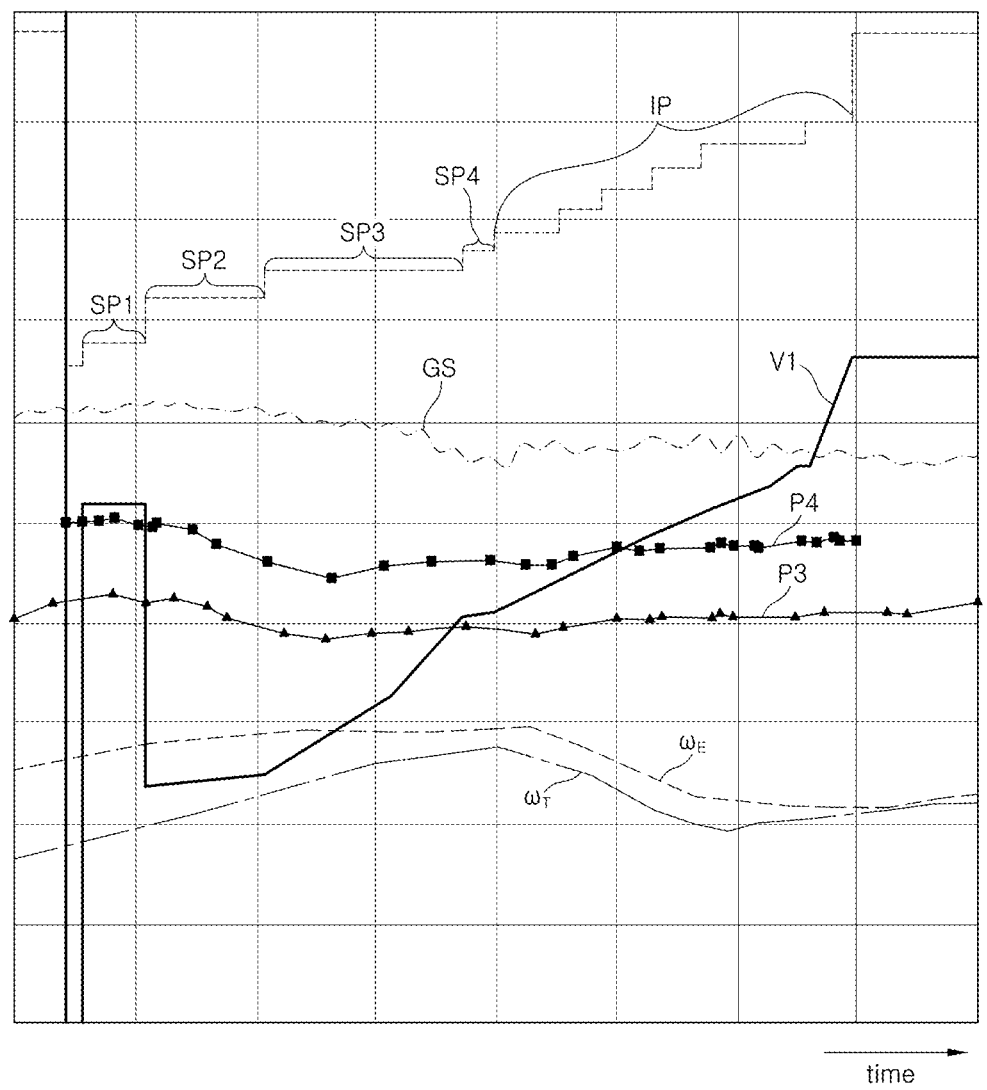
FIG. 14 is a view illustrating a normal shift process to which the present disclosure is not applied.
Figure 15:
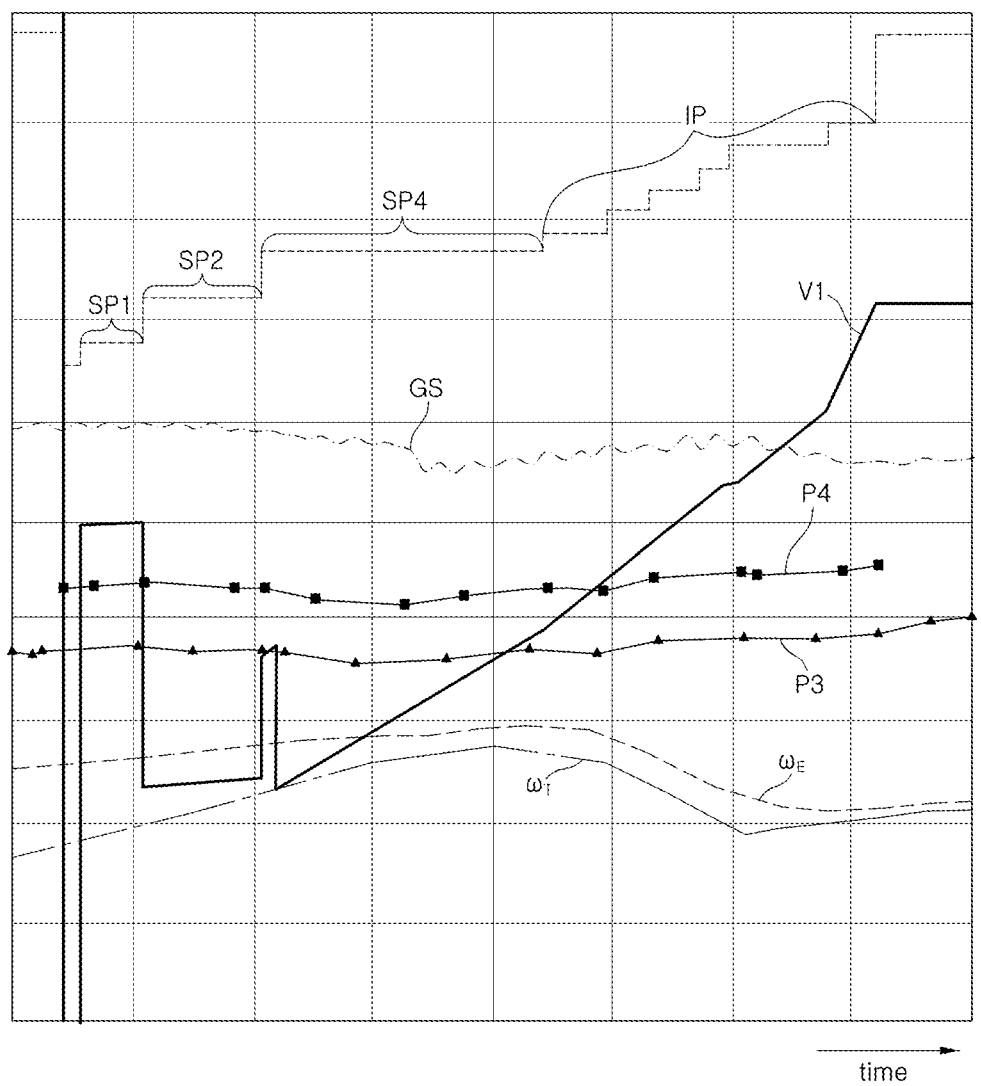
FIG. 15 is a view illustrating a shift process in the related art to which the present disclosure is not applied in a situation in which a first shift-initiation phase is skipped.

The cases in which the present disclosure is applied and not applied in the situation in which the first shift-initiation phase SP3 is skipped are compared with reference to FIGS. 14 to 15.

Figure 16:
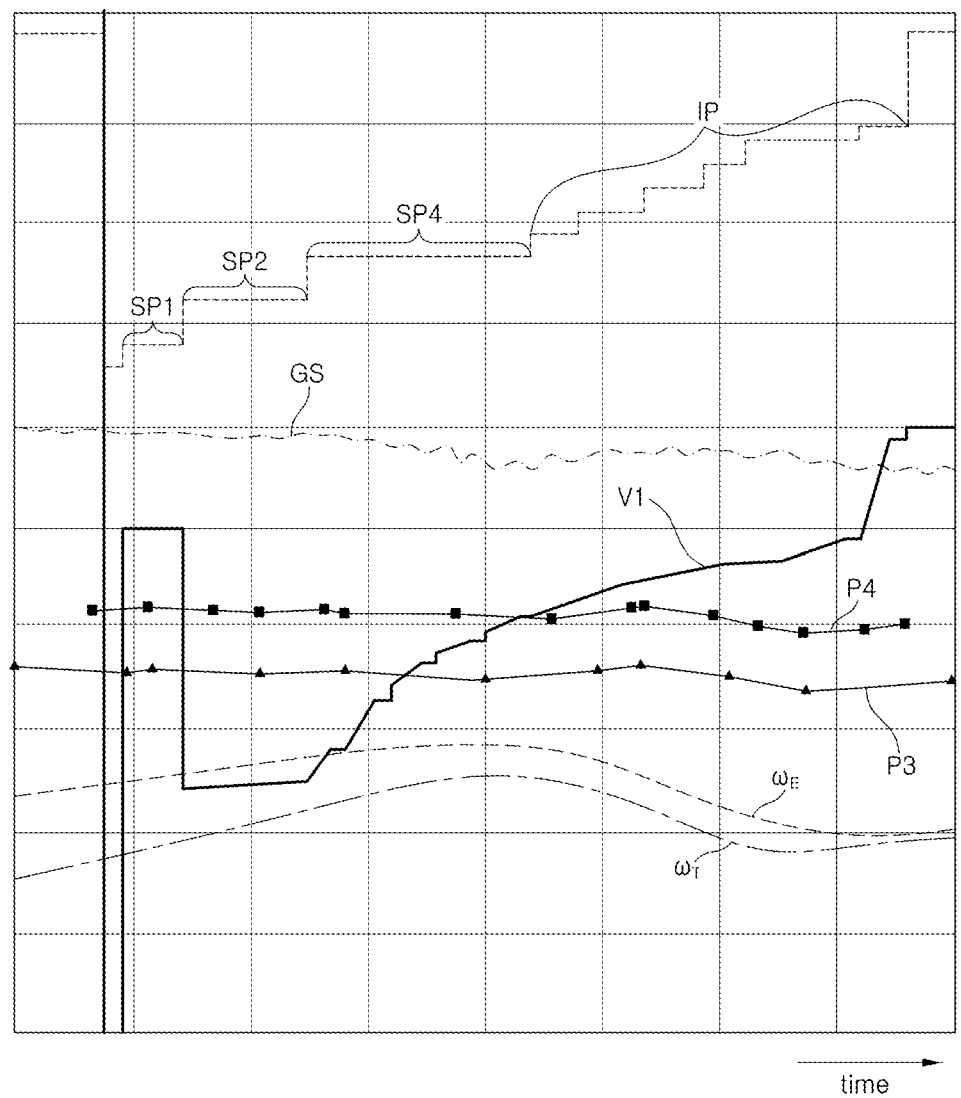
FIG. 16 is a view illustrating a shift process to which the present disclosure is applied in a situation in which the first shift-initiation phase is skipped.

For reference, for the above-mentioned comparison, FIG. 14 is a view illustrating a normal shift situation in which the present disclosure is not applied, FIG. 15 is a view illustrating a case in the related art in which the present disclosure is not applied in the situation in which the first shift-initiation phase SP3 is skipped, and FIG. 16 is a view illustrating a case in which the present disclosure is applied in the situation in which the first shift-initiation phase SP3 is skipped.

With reference to FIG. 14, it can be seen that the shift process includes the series of shift phases in which the fill-time phase SP1, the hydraulic-pressure-preparation phase SP2, the first shift-initiation phase SP3, the second shift-initiation phase SP4, and the inertia phase IP are sequentially connected, and the control hydraulic pressure basic calculation value V1 has a shape according to an ideal shift process calculated by the controller CLR as the first shift-initiation phase SP3 exists.

With reference to FIG. 15, it can be seen that in the state in which the first shift-initiation phase SP3 is skipped because of various causes such as hardware deviations of the transmission, the second shift-initiation phase SP4 is started immediately after the hydraulic-pressure-preparation phase SP2, and the control hydraulic pressure basic calculation value V1 calculated by the controller CLR has an abnormal shape because the controller CLR cannot acquire the data in the first shift-initiation phase SP3 required to control the second shift-initiation phase SP4.

This occurs because the controller CLR calculates the control hydraulic pressure basic calculation value V1 on the basis of completely wrong data, such as the use of data in the last shift phase that is typically effective in this situation.

With reference to FIG. 16, it can be seen that in the case in which the present disclosure is applied even in the state in which the first shift-initiation phase SP3 is skipped, the control hydraulic pressure basic calculation value V1 calculated by the controller CLR has a shape that is normal compared to FIG. 15 and similar to the shape in FIG. 14.

In this case, because the first shift-initiation phase SP3, which is the reference shift phase, does not exist when the controller CLR controls the second shift-initiation phase SP4, the controller CLR calculates the control hydraulic pressure basic calculation value V1 by using the engagement-side preliminary target pressure P3 as the back-up data, computes the control hydraulic pressure correction calculation value V2, and then controls the corresponding engagement-side shift element by using the control hydraulic pressure correction calculation value V2.

Figure 17:
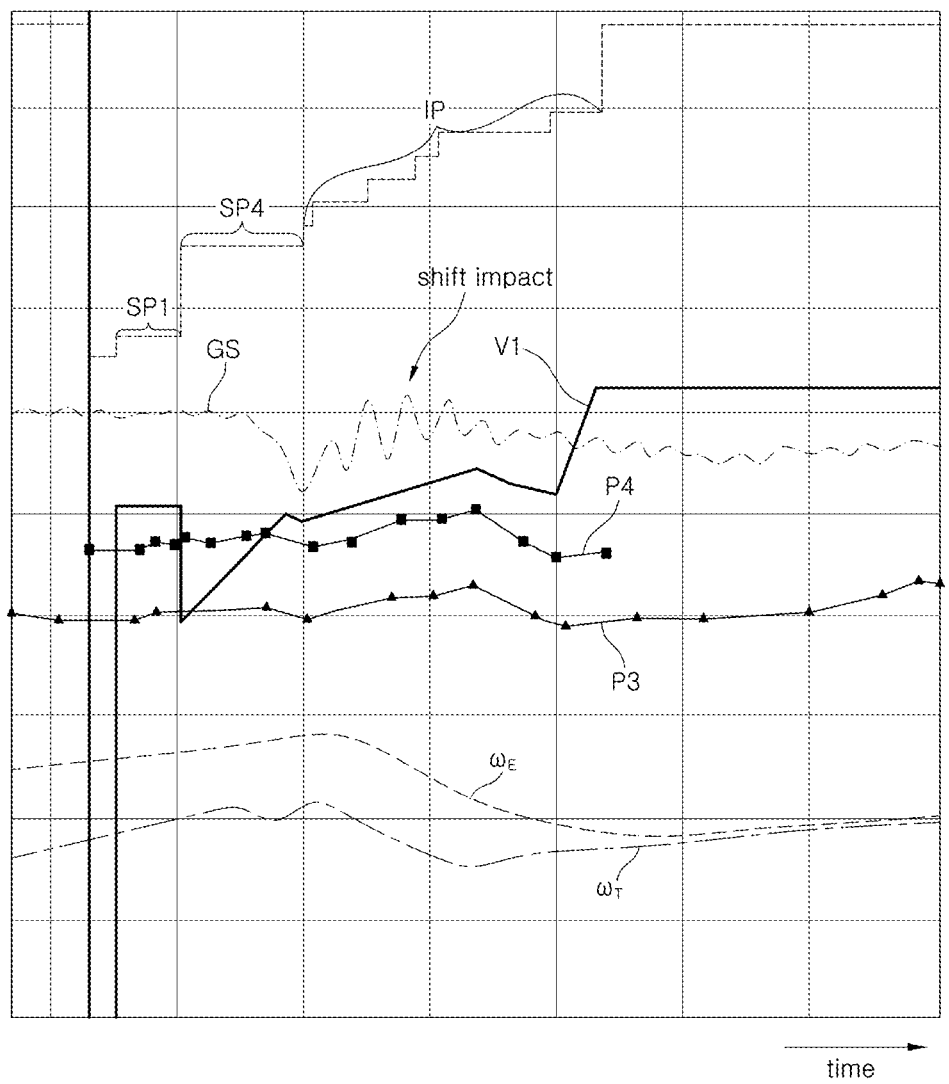
FIG. 17 is a view illustrating a shift process to which the present disclosure is not applied in a situation in which both a hydraulic-pressure-preparation phase SP2 and a first shift-initiation phase SP3 are skipped.
Figure 18:
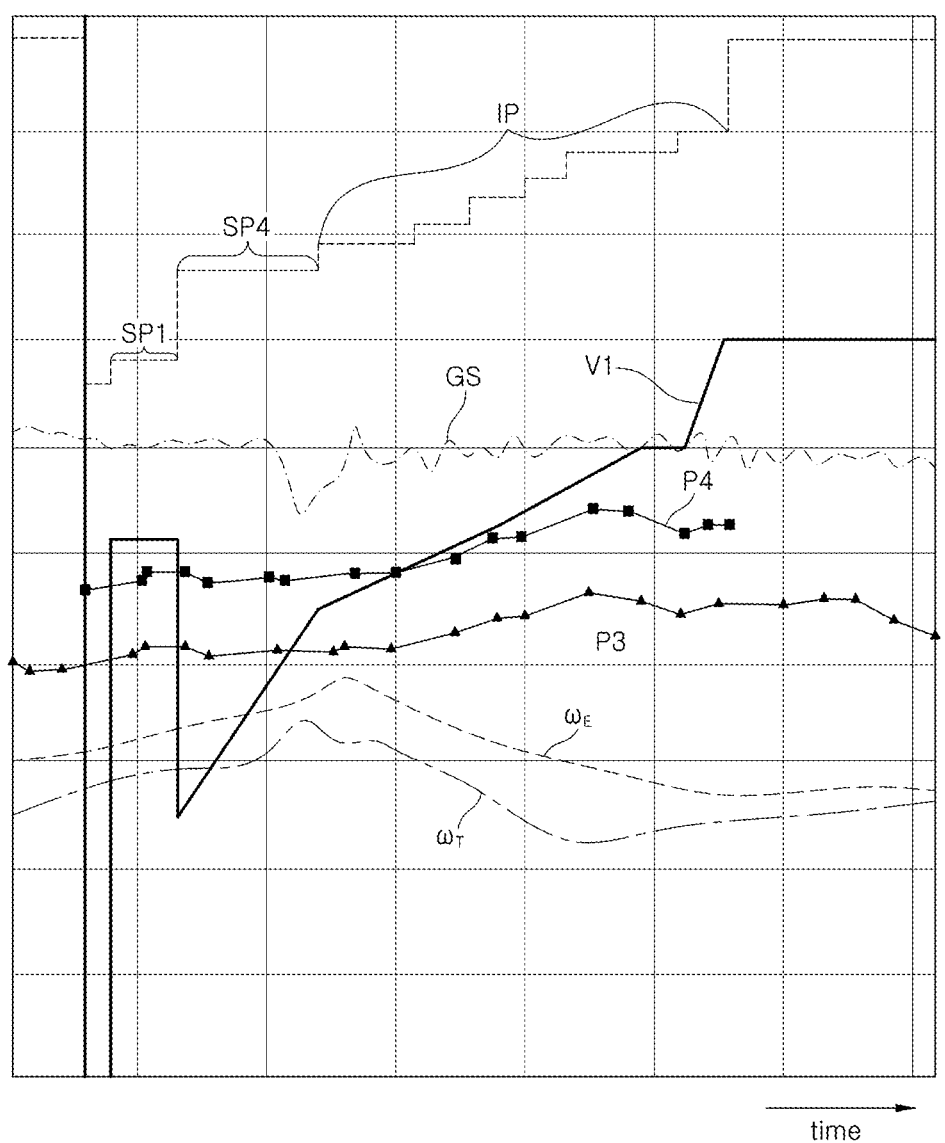
FIG. 18 is a view illustrating a shift process to which the present disclosure is applied in a situation in which both the hydraulic-pressure-preparation phase SP2 and the first shift-initiation phase SP3 are skipped.

Meanwhile, the cases in which the present disclosure is applied and not applied in a situation in which both the hydraulic-pressure-preparation phase SP2 and the first shift-initiation phase SP3 are skipped are compared with reference to FIGS. 17 and 18.

For reference, FIG. 14 illustrates the normal shift situation in which the present disclosure is not applied. FIG. 15 is a view illustrating a case in the related art in which the present disclosure is not applied in the situation in which both the hydraulic-pressure-preparation phase SP2 and the first shift-initiation phase SP3 are skipped, and FIG. 16 is a view illustrating a case in which the present disclosure is applied in the situation in which both the hydraulic-pressure-preparation phase SP2 and the first shift-initiation phase SP3 are skipped.

With reference to FIG. 17, it can be seen that in the state in which both the hydraulic-pressure-preparation phase SP2 and the first shift-initiation phase SP3 are skipped because of various causes such as hardware deviations of the transmission, the second shift-initiation phase SP4 is started immediately after the fill-time phase SP1, and the control hydraulic pressure basic calculation value V1 calculated by the controller CLR has an abnormal shape because the controller CLR cannot acquire the data in the first shift-initiation phase SP3 required to control the second shift-initiation phase SP4 and cannot acquire the data in the hydraulic-pressure-preparation phase SP2 required to control the first shift-initiation phase SP3 and these shift phases are excluded. Further, it can be seen that shift impact occurs because of rapid vibration of an acceleration signal GS measured by an acceleration sensor of the vehicle.

Meanwhile, with reference to FIG. 18, it can be seen that in the case in which the present disclosure is applied even in the state in which both the hydraulic-pressure-preparation phase SP2 and the first shift-initiation phase SP3 are skipped, the control hydraulic pressure basic calculation value V1 calculated by the controller CLR has a shape that is normal compared to FIG. 17 and similar to the shape in FIG. 14, and the vibration of the acceleration signal GS is also reduced compared to FIG. 17.

That is, the present disclosure aims to reduce or prevent the shift impact as much as possible and perform the shift process similar to the optimal shift process in the situation in which the shift phase is skipped.

In this case, because the first shift-initiation phase SP3, which is the reference shift phase, does not exist when the controller CLR controls the second shift-initiation phase SP4, the controller CLR calculates the control hydraulic pressure basic calculation value V1 by using the engagement-side preliminary target pressure P3 as the back-up data, computes the control hydraulic pressure correction calculation value V2, and then controls the corresponding engagement-side shift element by using the control hydraulic pressure correction calculation value V2.

Meanwhile, the controller CLR may calculate a gradient of the control hydraulic pressure correction calculation value V2 of the engagement-side shift element in the first shift-initiation phase SP3, as necessary.

In case that the first shift-initiation phase SP3, which is the reference shift phase, exists when the controller CLR calculates the gradient of the control hydraulic pressure correction calculation value V2 of the engagement-side shift element in the first shift-initiation phase SP3, the controller CLR calculates the gradient by subtracting the control hydraulic pressure correction calculation value V2 at the end of the hydraulic-pressure-preparation phase SP2 from the control hydraulic pressure correction calculation value V2 in the first shift-initiation phase SP3 and then dividing the resultant value by the elapsed time of the first shift-initiation phase SP3.

However, in case that the first shift-initiation phase SP3, which is the reference shift phase, does not exist when the controller CLR calculates the gradient of the control hydraulic pressure correction calculation value V2 of the engagement-side shift element in the first shift-initiation phase SP3, the controller CLR calculates the gradient by subtracting the control hydraulic pressure correction calculation value V2 at the end of the hydraulic-pressure-preparation phase SP2 from the engagement-side preliminary target pressure P3, which is reduced by multiplying the engagement-side basic target pressure P4, which is calculated as the hydraulic pressure of the engagement-side shift element when the turbine angular acceleration becomes zero by using the control matrix H, by the predetermined buffer coefficient and then dividing the resultant value by the elapsed time after the hydraulic-pressure-preparation phase SP2.

In addition, the controller CLR may calculate the gradient of the control hydraulic pressure correction calculation value V2 of the engagement-side shift element in the second shift-initiation phase SP4, as necessary.

When the controller CLR calculates the gradient of the control hydraulic pressure correction calculation value V2 of the engagement-side shift element in the second shift-initiation phase SP4, the controller CLR calculates the gradient by dividing, by the elapsed time of the second shift-initiation phase SP4, a difference between the engagement-side basic target pressure P4, which is calculated as the hydraulic pressure of the engagement-side shift element when the angular acceleration of the turbine becomes zero by using the control matrix H, and the engagement-side preliminary target pressure P3 that is reduced by multiplying the engagement-side basic target pressure P4 by the predetermined buffer coefficient.

While the specific embodiments of the present disclosure have been illustrated and described, it will be obvious to those skilled in the art that the present disclosure may be variously modified and changed without departing from the technical spirit of the present disclosure defined in the appende

The invention claimed is:

1. A shift control method for a vehicle powertrain, the shift control method comprising:
    calculating, by a controller configured to divide a shift process into a series of shift phases and perform shift control based on the shift phase, a control hydraulic pressure basic calculation value for implementing a necessary torque of a control target shift element based on the shift phase by using a control matrix created from a vehicle powertrain model;
    calculating a control hydraulic pressure correction calculation value by correcting the control hydraulic pressure basic calculation value with a correction value including a learning value for the shift element; and
    controlling the control target shift element on the basis of the control hydraulic pressure correction calculation value;
    wherein in the calculating of the control hydraulic pressure basic calculation value, the controller calculates the control hydraulic pressure basic calculation value by using predetermined back-up data when a predetermined reference shift phase for specifying data required to calculate the control hydraulic pressure basic calculation value does not exist.

2. The shift control method of claim 1, wherein when the predetermined reference shift phase exists, the controller calculates the control hydraulic pressure basic calculation value by using the control hydraulic pressure correction calculation value in the predetermined reference shift phase.

3. The shift control method of claim 2, wherein when a hydraulic-pressure-preparation phase of an engagement-side shift element, which is the predetermined reference shift phase, exists when the controller calculates the control hydraulic pressure basic calculation value in an engagement preparation state of the engagement-side shift element, the controller calculates the control hydraulic pressure basic calculation value by using the control hydraulic pressure correction calculation value at an end of the hydraulic-pressure-preparation phase.

4. The shift control method of claim 3, wherein when the hydraulic-pressure-preparation phase of the engagement-side shift element, which is the predetermined reference shift phase, does not exist when the controller calculates the control hydraulic pressure basic calculation value in the engagement preparation state of the engagement-side shift element, the controller uses, as the back-up data, an engagement-side basic preparation hydraulic pressure, which is calculated as a hydraulic pressure of the engagement-side shift element required to prevent a shifting sag phenomenon by using the control matrix.

5. The shift control method of claim 2, wherein when a first shift-initiation phase of an engagement-side shift element, which is the predetermined reference shift phase, exists when the controller calculates the control hydraulic pressure basic calculation value in a preliminary target state of the engagement-side shift element, the controller calculates the control hydraulic pressure basic calculation value by using the control hydraulic pressure correction calculation value at an end of the first shift-initiation phase.

6. The shift control method of claim 5, wherein when the first shift-initiation phase of the engagement-side shift element, which is the predetermined reference shift phase, does not exist when the controller calculates the control hydraulic pressure basic calculation value in the preliminary target state of the engagement-side shift element, the controller uses, as the back-up data, a engagement-side preliminary target pressure reduced by multiplying an engagement-side basic target pressure, which is calculated as an engagement-side shift element hydraulic pressure when a turbine angular acceleration becomes zero by using the control matrix, by a predetermined buffer coefficient.

7. The shift control method of claim 2, wherein when the predetermined reference shift phase does not exist, the controller calculates an engagement-side basic target pressure that is an engagement-side shift element hydraulic pressure when a turbine angular acceleration becomes zero by using the control matrix, and the controller uses, as the back-up data, an engagement-side preliminary target pressure reduced by multiplying the engagement-side basic target pressure by a predetermined buffer coefficient.

8. The shift control method of claim 1, wherein when a first shift-initiation phase, which is the predetermined reference shift phase, exists when the controller calculates a gradient of the control hydraulic pressure correction calculation value of an engagement-side shift element in the first shift-initiation phase, the controller calculates the gradient by subtracting the control hydraulic pressure correction calculation value at an end of a hydraulic-pressure-preparation phase from the control hydraulic pressure correction calculation value in the first shift-initiation phase and then dividing a resultant value by an elapsed time of the first shift-initiation phase.

9. The shift control method of claim 8, wherein when the first shift-initiation phase, which is the predetermined reference shift phase, does not exist when the controller calculates the gradient of the control hydraulic pressure correction calculation value of the engagement-side shift element in the first shift-initiation phase, the controller calculates the gradient by subtracting the control hydraulic pressure correction calculation value at the end of the hydraulic-pressure-preparation phase from an engagement-side preliminary target pressure reduced by multiplying an engagement-side basic target pressure, which is calculated as an engagement-side shift element hydraulic pressure when a turbine angular acceleration becomes zero by using the control matrix, by a predetermined buffer coefficient and then dividing the resultant value by an elapsed time after the hydraulic-pressure-preparation phase.

10. The shift control method of claim 1, wherein when the controller calculates a gradient of the control hydraulic pressure correction calculation value of an engagement-side shift element in a second shift-initiation phase, the controller calculates the gradient by dividing, by an elapsed time of the second shift-initiation phase, a difference between an engagement-side basic target pressure, which is calculated as an engagement-side shift element hydraulic pressure when a turbine angular acceleration becomes zero by using the control matrix, and an engagement-side preliminary target pressure reduced by multiplying the engagement-side basic target pressure by a predetermined buffer coefficient.

11. The shift control method of claim 1, wherein the control matrix is calculated by using relationship formulas of angular velocities, angular accelerations, moments of inertia, and torques of powertrain components and using a boundary condition according to a state of a transmission, and the controller performs the calculating of the control hydraulic pressure basic calculation value by selecting a predetermined control matrix based on whether the transmission is shifting and a type of shifting.

12. The shift control method of claim 11, wherein the control matrix is calculated by multiplying a reverse matrix of an angular acceleration dominant matrix, which includes coefficients of angular acceleration terms of the relationship formulas, by an external torque dominant matrix including coefficients of external torque terms of the relationship formulas, and wherein the external torque are torques that are controlled by the controller or inputted to the powertrain from an outside.

13. The shift control method of claim 12, wherein the control matrix comprises:

an in-gear state control matrix related to an in-gear state in which the transmission is not shifting; and a dynamic state control matrix related to a state in which the transmission is shifting.

14. The shift control method of claim 13, wherein a plurality of in-gear state control matrices are provided one by one for each shift position implemented by the transmission, and a plurality of dynamic state control matrices are provided one by one for each shift element continuously kept in an engaged state during a shift process.

15. The shift control method of claim 14, wherein when the transmission is shifting, the controller selects the control matrix for the shift element continuously kept in the engaged state before and after the shift process among the plurality of dynamic state control matrices.

16. The shift control method of claim 15, wherein in a state in which the angular acceleration terms of the relationship formulas are separated in the form of a product of an angular acceleration coefficient matrix and an angular acceleration column vector and placed on one side of an equal sign, and the external torque terms of the relationship formulas are separated in the form of a product of an external torque coefficient matrix and an external torque column vector and placed on the other side;

the angular acceleration dominant matrix, among the external torque coefficient matrix, is configured as a square matrix created by:

connecting and placing, to a right side of the angular acceleration coefficient matrix, a stiffness connection matrix created by multiplying, by -1, columns of the coefficients for the external torque terms considered as linear variables that vary depending on torque inputted to the powertrain by treating the powertrain components as completely connected;

connecting and placing, at a bottom side of the angular acceleration coefficient matrix, a boundary condition matrix including rows representing boundary conditions according to the state of the transmission; and disposing a dummy matrix, which is filled with zero, at a position at which the boundary condition matrix and the stiffness connection matrix of the angular acceleration coefficient matrix intersect.

17. The shift control method of claim 16, wherein the external torque dominant matrix comprises the dummy matrix in which columns used for the stiffness connection matrix are filled with zero, and rows corresponding to the boundary condition matrix of the angular acceleration dominant matrix are filled with zero among the external torque coefficient matrix.

* * * * *